(12) United States Patent
Hoshino et al.

(10) Patent No.: US 12,032,188 B2
(45) Date of Patent: Jul. 9, 2024

(54) OPTICALLY ANISOTROPIC FILM, OPTICAL FILM, AND DISPLAY DEVICE

(71) Applicant: FUJIFILM Corporation, Tokyo (JP)

(72) Inventors: Wataru Hoshino, Kanagawa (JP); Madoka Kawai, Kanagawa (JP); Shinya Watanabe, Kanagawa (JP); Takuya Inoue, Kanagawa (JP); Kengo Saito, Kanagawa (JP); Naoya Nishimura, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 18/447,862

(22) Filed: Aug. 10, 2023

(65) Prior Publication Data

US 2023/0384498 A1 Nov. 30, 2023

Related U.S. Application Data

(63) Continuation of application No. PCT/JP2022/005646, filed on Feb. 14, 2022.

(30) Foreign Application Priority Data

Feb. 16, 2021 (JP) .................................. 2021-022413

(51) Int. Cl.
*G02B 5/30* (2006.01)
*C09K 19/38* (2006.01)
(Continued)

(52) U.S. Cl.
CPC ........ *G02B 5/3016* (2013.01); *C09K 19/3852* (2013.01); *C09K 19/56* (2013.01); *C09K 19/601* (2013.01)

(58) Field of Classification Search
CPC .. G02B 5/3016; C09K 19/3852; C09K 19/56; C09K 19/601
(Continued)

(56) References Cited

U.S. PATENT DOCUMENTS

2009/0153783 A1 6/2009 Umemoto
2010/0253615 A1 10/2010 Han et al.

FOREIGN PATENT DOCUMENTS

JP 2009-145776 A 7/2009
JP 2018-036295 A 3/2018
(Continued)

OTHER PUBLICATIONS

International Search Report issued in PCT/JP2022/005646 on Apr. 5, 2022.
(Continued)

*Primary Examiner* — Charles S Chang
(74) *Attorney, Agent, or Firm* — Edwards Neils LLC; Jean C. Edwards, Esq.

(57) ABSTRACT

Provided is an optically anisotropic film, an optical film, and a display device, which have a high contrast and excellent light fastness. The optically anisotropic film includes a liquid crystal compound and a dichroic substance, in which the liquid crystal compound is vertically aligned, the dichroic substance forms an arrangement structure, and in a case where, in a cross section observed with a scanning transmission electron microscope, a length of a major axis of the arrangement structure is defined as L, and a length of a minor axis of the arrangement structure is defined as D, 16 or more arrangement structures satisfying L≥30 nm are observed per 40 μm².

12 Claims, 3 Drawing Sheets

(51) Int. Cl.
  *C09K 19/56*  (2006.01)
  *C09K 19/60*  (2006.01)

(58) Field of Classification Search
  USPC .......................... 349/79, 117–121, 163–165
  See application file for complete search history.

(56) References Cited

FOREIGN PATENT DOCUMENTS

| JP | 2018-147761 A | 9/2018 | | |
|---|---|---|---|---|
| JP | 2018-152170 A | 9/2018 | | |
| JP | WO 2020004303 A1 * | 1/2020 | .............. | G02B 5/30 |
| WO | 2020/004303 A1 | 1/2020 | | |

OTHER PUBLICATIONS

Written Opinion issued in PCT/JP2022/005646 on Apr. 5, 2022.
International Preliminary Report on Patentability completed by WIPO on Aug. 22, 2023 in connection with International Patent Application No. PCT/JP2022/005646.

* cited by examiner

OPTICALLY ANISOTROPIC FILM, OPTICAL FILM, AND DISPLAY DEVICE

CROSS-REFERENCE TO RELATED APPLICATIONS

This application is a Continuation of PCT International Application No. PCT/JP2022/005646 filed on Feb. 14, 2022, which was published under PCT Article 21(2) in Japanese, and which claims priority under 35 U.S.C. § 119(a) to Japanese Patent Application No. 2021-022413 filed on Feb. 16, 2021. The above applications are hereby expressly incorporated by reference, in their entirety, into the present application.

BACKGROUND OF THE INVENTION

1. Field of the Invention

The present invention relates to an optically anisotropic film, an optical film, and a display device.

2. Description of the Related Art

In order to prevent peeping into an image display device and control the viewing angle, a technique of using an optically anisotropic film having an absorption axis in the thickness direction is known. For example, JP2009-145776A discloses a viewing angle control system including a polarizer (optically anisotropic film) which contains a dichroic substance and in which the angle between an absorption axis and a normal line of a film surface is in a range of 0° to 45°.

SUMMARY OF THE INVENTION

As a result of examination on the viewing angle control system described in JP2009-145776A, the present inventors clarified that there is room for improvement in a difference (hereinafter, referred to as "contrast") between a transmittance of a film in a front direction and a transmittance of the film in an oblique direction, the light fastness is degraded, and particularly the transmittance in an oblique direction which contributes to prevention of peeping greatly changes.

Therefore, an object of the present invention is to provide an optically anisotropic film, an optical film, and a display device, which have a high contrast and excellent light fastness.

As a result of intensive examination conducted by the present inventors in order to achieve the above-described object, it was found that in a case where a liquid crystal compound is vertically aligned and a dichroic substance forms a specific number of arrangement structures with a predetermined size, the contrast of an optically anisotropic film increases, and the light fastness is enhanced, thereby completing the present invention.

That is, the present inventors found that the above-described object can be achieved by employing the following configurations.

[1] An optically anisotropic film comprising: a liquid crystal compound; and a dichroic substance, in which the liquid crystal compound is vertically aligned, the dichroic substance forms an arrangement structure, and in a case where, in a cross section observed with a scanning transmission electron microscope, a length of a major axis of the arrangement structure is defined as L, and a length of a minor axis of the arrangement structure is defined as D, 16 or more arrangement structures satisfying $L \geq 30$ nm are observed per 40 $\mu m^2$.

[2] The optically anisotropic film according to [1], in which a ratio of the number of arrangement structures in which an angle between the major axis of the arrangement structure and a normal direction of the optically anisotropic film is 20° or greater to the number of the arrangement structures is 28.0% or greater.

[3] The optically anisotropic film according to [1], in which less than 3 arrangement structures satisfying $L \geq 240$ nm are observed per 40 $\mu m^2$.

[4] An optical film comprising: a transparent film base material; and the optically anisotropic film according to any one of [1] to [3], which is disposed on the transparent film base material.

[5] The optical film according to [4], further comprising: an alignment film between the transparent film base material and the optically anisotropic film.

[6] The optical film according to [4] or [5], further comprising: a polarizer which has an absorption axis in a plane, in which the optical film is used to control a viewing angle.

[7] A display device comprising: the optical film according to [6]; and a display element.

According to the present invention, it is possible to provide an optically anisotropic film, an optical film, and a display device, which have a high contrast and excellent light fastness.

DESCRIPTION OF THE PREFERRED EMBODIMENTS

Figure 1:
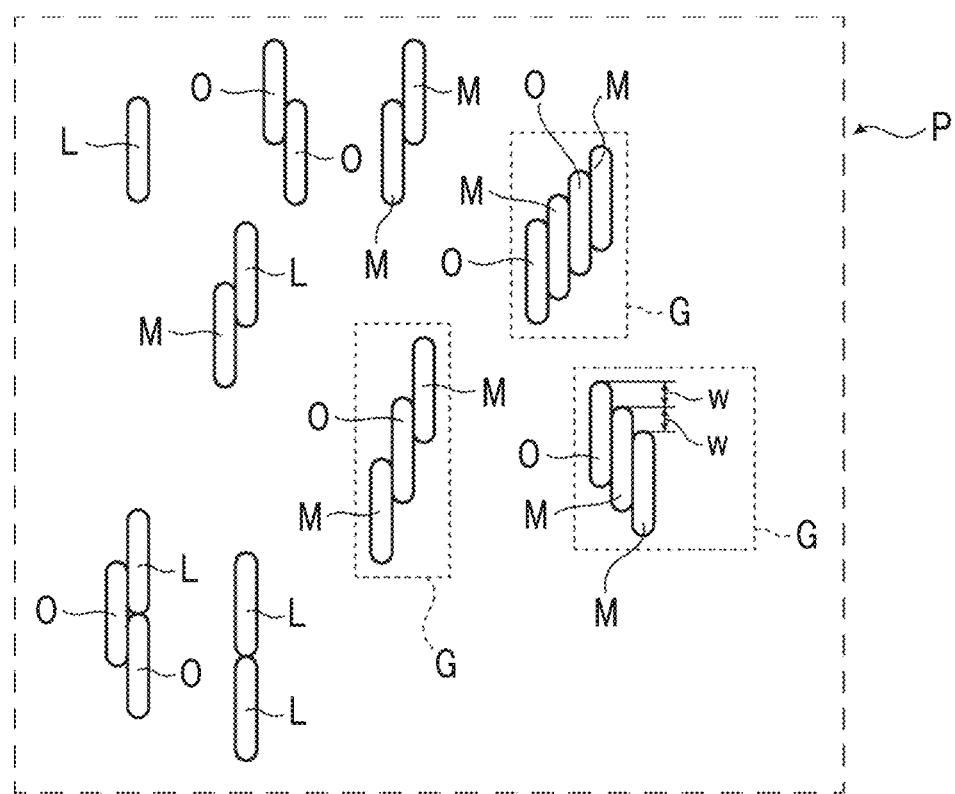
FIG. 1 is a conceptual view showing an example of a state where a first dichroic substance and a second dichroic substance form an arrangement structure.

Hereinafter, the present invention will be described in detail.

The description of configuration requirements described below may be made based on typical embodiments of the present invention, but the present invention is not limited to such embodiments.

Further, in the present specification, the numerical ranges shown using "to" indicate ranges including the numerical values described before and after "to" as the lower limits and the upper limits.

Further, in the present specification, the terms parallel, orthogonal, horizontal, and vertical do not indicate parallel, orthogonal, horizontal, and vertical in a strict sense, but indicate a range of parallel ±10°, a range of orthogonal ±10°, a range of horizontal ±10°, and a range of vertical ±10° respectively.

Further, in the present specification, materials corresponding to respective components may be used alone or in combination of two or more kinds thereof. Here, in a case where two or more kinds of materials corresponding to respective components are used in combination, the content of the components indicates the total content of the combined materials unless otherwise specified.

Further, in the present specification, "(meth)acrylate" is a notation representing "acrylate" or "methacrylate", "(meth)acryl" is a notation representing "acryl" or "methacryl", and "(meth)acryloyl" is a notation representing "acryloyl" or "methacryloyl".

[Optically Anisotropic Film]

An optically anisotropic film according to the embodiment of the present invention is an optically anisotropic film including a liquid crystal compound and a dichroic substance, in which the liquid crystal compound is vertically aligned, and the dichroic substance forms an arrangement structure.

Further, in the optically anisotropic film according to the embodiment of the present invention, in a case where in a cross section observed with a scanning transmission electron microscope, the length of a major axis of the arrangement structure is defined as L, and the length of a minor axis of the arrangement structure is defined as D, 16 or more arrangement structures satisfying L≥30 nm are observed per 40 μm².

In the present invention, as described above, since the liquid crystal compound is vertically aligned and the dichroic substance forms 16 or more arrangement structures satisfying L≥30 nm per 40 μm², the contrast of the optically anisotropic film is increased, and the light fastness is enhanced.

The reason for this is not clear, but the present inventors presume as follows.

First, it is considered that the contrast and the light fastness of the optically anisotropic film are affected by a state where the dichroic substance is present, and the light fastness is improved by the dichroic substance forming an arrangement structure.

Further, it is considered that light is scattered and the contrast is decreased in a case where the size of the arrangement structure of the dichroic substances is extremely large (or the number of alignment structures is extremely large), and conversely, the light fastness is degraded in a case where the size of the arrangement structure of the dichroic substances is extremely small (or the number of arrangement structures is zero or extremely small).

Therefore, the present inventors presume that an optically anisotropic film having a high contrast and satisfactory light fastness can be obtained in a case where the arrangement structure is in the above-described range.

[Vertical Alignment]

In the optically anisotropic film according to the embodiment of the present invention, the liquid crystal compound is vertically aligned as described above.

Further, in the optically anisotropic film according to the embodiment of the present invention, it is preferable that the dichroic substance is also vertically aligned along the liquid crystal compound.

Here, the vertical alignment denotes that a molecular axis of the liquid crystal compound (for example, a major axis corresponds to the molecular axis in a case of a rod-like liquid crystal compound) is vertical to the main surface of the optically anisotropic film, but the axis is not required to be strictly vertical to the surface, and the tilt angle between an average molecular axis of the liquid crystal compound in the optically anisotropic film and the main surface of the optically anisotropic film is less than 90°±10°.

Further, the tilt angle can be measured using AxoScan OPMF-1 (manufactured by Opto Science, Inc.).

Specifically, an extinction coefficient ko [λ] (in-plane direction) and an extinction coefficient ke [λ] (thickness direction) are calculated using AxoScan OPMF-1 (manufactured by Opto science, Inc.) by measuring the Mueller matrix of the optically anisotropic film at a wavelength λ and at room temperature while the polar angle is changed from −50° to 50° by 10°, removing the influence of the surface reflection, and fitting the result to the following theoretical formula in consideration of the Snell's formula and Fresnel's equations. Unless otherwise specified, the wavelength λ is 550 nm.

$$k=-\log(T)\times\lambda/(4\pi d)$$

Here, T represents the transmittance, and d represents the thickness of the optically anisotropic film.

By calculating the absorbance and the dichroic ratio in the in-plane direction and the thickness direction based on the calculated ko [λ] and ke [λ], it can be confirmed whether the liquid crystal compound and the dichroic substance are vertically aligned.

[Arrangement Structure]

In the optically anisotropic film according to the embodiment of the present invention, the dichroic substance forms an arrangement structure as described above.

Here, the arrangement structure denotes a state where the dichroic substance is collected to form an aggregate in the optically anisotropic film and molecules of the dichroic substances are periodically arranged in the aggregate.

Further, the arrangement structure may be formed of only the dichroic substance or may be formed of the liquid crystal compound and the dichroic substance.

Further, the arrangement structure may be formed of one or a plurality of kinds of dichroic substances.

Further, an arrangement structure formed of a certain kind of dichroic substance and an arrangement structure formed of another kind of dichroic substance may be mixedly present in the optically anisotropic film.

Further, in a case where the optically anisotropic film contains a plurality of kinds of dichroic substances, all kinds of dichroic substances among the plurality of kinds of dichroic substances contained in the optically anisotropic film may form arrangement structures or some kinds of dichroic substances among the plurality of kinds of dichroic substances may form arrangement structures.

FIG. 1 is a conceptual view showing an example of the state in which the first dichroic substance and the second dichroic substance form an arrangement structure. An optically anisotropic film P has a molecule M of the first dichroic substance, a molecule O of the second dichroic substance, and a molecule L of the liquid crystal compound. As shown in FIG. 1, an aggregate G having the molecule M and the molecule O is formed, the major axis directions of the molecule M and the molecule O are aligned along the same direction in the aggregate G, and the molecule M and the molecule O are arranged so as to be shifted in a period of a width w.

Figure 2:
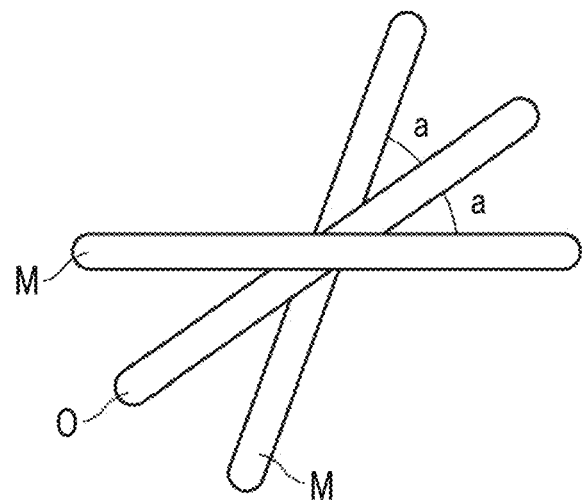
FIG. 2 is a conceptual view showing an example of the arrangement structure formed of the first dichroic substance and the second dichroic substance.

The arrangement structure formed of the first dichroic substance and the second dichroic substance is not limited to the arrangement structure shown in FIG. 1. For example, as shown in FIG. 2, the molecule M and the molecule O may be arranged so as to be shifted in a period of an angle a.

Further, as described above, in a cross section of the optically anisotropic film according to the embodiment of the present invention which is observed with a scanning transmission electron microscope, in a case where the length of the major axis of the arrangement structure is defined as L, and the length of the minor axis of the arrangement structure is defined as D, 16 or more arrangement structures satisfying L≥30 nm are observed per 40 μm².

Figure 3:
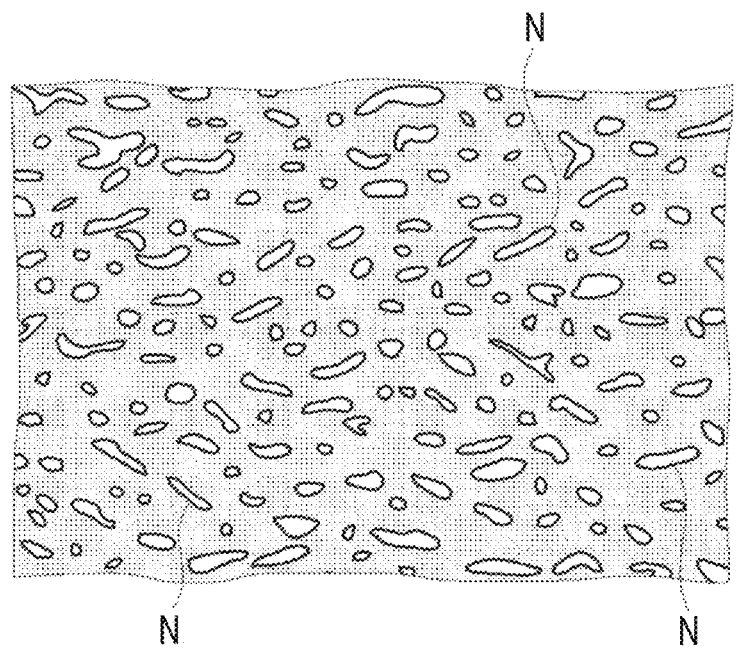
FIG. 3 is a view conceptually showing a cross section of an example of an optically anisotropic film of the present invention.

FIG. 3 is a view conceptually showing a cross section of an example of the optically anisotropic film according to the embodiment of the present invention.

In FIG. 3, portions shown in white in the figure are arrangement structures. In the example shown in FIG. 3, the arrangement structures denoted by the symbol N are the arrangement structure satisfying L≥30 nm as an example.

In the present invention, a cross section is observed with a scanning transmission electron microscope (hereinafter, also abbreviated as "STEM") specifically in the following manner.

First, an ultrathin section having a thickness of 100 nm in the film thickness direction is prepared from the optically anisotropic film using an ultramicrotome.

Next, the ultrathin section is placed on a grid with a carbon support film for STEM observation.

Thereafter, the entire grid is installed in a scanning transmission electron microscope, and the cross section is observed at an electron beam acceleration voltage of 30 kV.

Further, the length L of the major axis and the length D of the minor axis of the arrangement structure are measured specifically in the following manner.

First, the cross section of the optically anisotropic film is observed with a STEM as described above, the captured image is analyzed, a frequency histogram is created, and the frequency at which the frequency is maximized and the standard deviation of the frequency distribution are acquired. Next, a frequency that is 1.3 times the standard deviation from the frequency at which the frequency is maximum on a dark side is defined as a threshold value. Next, an image in which the brightness is binarized using this threshold value is created, and portions with a major axis of 30 nm or greater are extracted as arrangement structures from the binarized dark region.

Further, each of the extracted arrangement structures is approximated to an ellipse, the length of the major axis of the approximated ellipse is defined as the length L of the major axis of the arrangement structure, and the length of the minor axis of the approximated ellipse is defined as the length D of the minor axis of the arrangement structure. Further, an angle between an axis vertical to the film surface (normal direction of the optically anisotropic film) and the major axis of the approximated ellipse is defined as an angle between the major axis of the arrangement structure and the normal direction of the optically anisotropic film.

The length L of the major axis and the length D of the minor axis of such an arrangement structure may be measured using known image processing software. Examples of the image processing software include image processing software "ImageJ".

Further, as described above, in a case where the length of the major axis of the arrangement structure is defined as L, and the length of the minor axis of the arrangement structure is defined as D, the optically anisotropic film according to the embodiment of the present invention has 16 or more arrangement structures, preferably 20 to 100 arrangement structures, and more preferably 30 to 80 arrangement structures satisfying L≥30 nm per 40 μm².

Specifically, arrangement structures satisfying L≥30 nm are extracted and counted by performing image analysis as described above, in optionally selected three regions with an area of 13.58 μm² (40 μm² in total) that do not overlap each other.

Such arrangement structures are counted in optionally selected ten regions with an area of 40 μm² (13.58 μm²×3) that do not overlap each other.

Thereafter, the average value of the numbers of arrangement structures in the ten regions that have been measured is calculated, and this average value is defined as the number of arrangement structures satisfying L≥30 nm per 40 μm².

In addition, the area of the actual region to be measured is 13.58 μm²×3=40.74 μm², but in the present invention, the fraction is rounded down and the area is referred to as "per 40 μm²" for convenience.

In the present invention, from the viewpoint of further increasing the contrast of the optically anisotropic film, the number of arrangement structures satisfying L≥240 nm to be observed per 40 μm² is preferably less than 3, more preferably less than 1, and still more preferably zero.

In the present invention, from the viewpoint of further increasing the contrast of the optically anisotropic film and further improving the light fastness thereof, the ratio of the number of arrangement structures in which the angle between the major axis of the arrangement structure and the normal direction of the optically anisotropic film is 20° or greater to the number of the arrangement structures is preferably 28.0% or greater, more preferably 50.0% or greater, and still more preferably 70.0% or greater.

<Associate>

In the present invention, it is preferable that the dichroic substance forms an associate in the arrangement structure. In a case where an associate is formed, there is an advantage that the contrast of the optically anisotropic film is further increased and the light fastness is further improved.

Examples of a method of verifying that the dichroic substance forms an associate include a method of comparing the maximum absorption wavelength measured using the formed film with the maximum absorption wavelength of a solution.

Specific examples of a method of measuring the maximum absorption wavelength using the formed film include a method of preparing a film aligned vertically to a thick film (thickness of 10 μm or greater), cutting this film, and measuring the absorption spectrum of the cross section of the film with a device such as MSV-5200 (manufactured by JASCO Corporation).

Further, other examples of the method of measuring the maximum absorption wavelength using the formed film include a method of preparing a film that is formed by the same method as the method for the optically anisotropic film according to the embodiment of the present invention except that the film is not aligned, using a composition forming the optically anisotropic film according to the embodiment of the present invention and measuring the absorption spectrum of the film. In addition, examples of a method of not aligning the composition forming the optically anisotropic film include a method of controlling the alignment according to the presence or absence of an alignment agent or an interface improver described below, adjustment of the amount thereof, the presence or absence of an alignment film described below, or a change of the alignment film.

Here, the maximum absorption wavelength of a solution is considered to be the maximum absorption wavelength in a state in which the dichroic substance is used alone (no interaction between dichroic substances) in a case where the solution is a sufficiently diluted solution.

Meanwhile, in a case where the maximum absorption wavelength measured using the film is different from the maximum absorption wavelength of the solution, the dichroic substance is considered to interact with another substance (that is, an associate is formed).

Specifically, a maximum absorption wavelength $\lambda s$ in the absorption spectrum of the solution in which the dichroic substance is dissolved is acquired. Here, the concentration of the diluted solution is preferably 3.0% or less and more preferably 2.0% or less.

Next, a film F for measuring the maximum absorption wavelength is formed by casting a liquid crystal composition containing at least a liquid crystal compound and a dichroic substance onto a substrate (for example, blue plate glass), heating and aging the composition using the same method as the method for the optically anisotropic film according to the embodiment of the present invention, and irradiating the composition with ultraviolet rays to cure the composition. Further, the absorption spectrum of the film F is measured at a pitch of 0.5 nm in a wavelength range of 380 to 800 nm and a maximum absorption wavelength $\lambda f$ is acquired.

It is found that in a case where $\lambda s$ and $\lambda f$ described above satisfy Expression (D), the dichroic substance forms an associate in the arrangement structure due to the following reason.

$$|\lambda s - \lambda f| \geq 2.0 \text{ nm} \quad (D)$$

That is, since the absorption spectrum of the solution in which the dichroic substance is dissolved is interpreted as the absorption spectrum in one molecule of the dichroic substance, in a case where the maximum absorption wavelength $\lambda s$ of the absorption spectrum and the maximum absorption wavelength $\lambda f$ of the absorption spectrum of the film F satisfy Expression (D), it can be said that the maximum absorption wavelength is shifted due to the association of the dichroic substances in the film F.

<Crystal Structure>

In the present invention, it is preferable that the dichroic substance forms a crystal structure in the arrangement structure. In a case where a crystal structure is formed, there is an advantage that the contrast of the optically anisotropic film is further increased and the light fastness is further improved.

Examples of a method of verifying that the dichroic substance forms a crystal structure include a method based on an X-ray diffraction (XRD) spectrum to be measured using an optically anisotropic film.

Further, in the production of each film (optically anisotropic film) for which the XRD spectra are compared in the following description, the areas and the film thicknesses of the films are required to be the same as each other by setting the kind of an underlayer (for example, the substrate), the concentration of the composition, the coating conditions to be uniform except for a change of the kind of the dichroic substance contained in each film.

Specifically, the optically anisotropic film is subjected to X-ray diffraction analysis using an in-plane method. Hereinafter, the X-ray diffraction analysis performed using an in-plane method is also referred to as "in-plane XRD".

The in-plane XRD is performed by irradiating the surface of a polarizer layer with X-rays using a thin film X-ray diffractometer.

The orientation in the plane of the substrate where the peak intensity is maximized is determined by performing the in-plane XRD in all directions at intervals of 15° using an appropriate in-plane direction as a reference and performing φ scan on the observed peaks. The dichroic substance can be verified to form a crystal structure by comparing XRD spectra between the film obtained by laminating up to the alignment film described below and the film obtained by laminating the optically anisotropic film according to the embodiment of the present invention on the alignment film and comparing XRD spectra between the film obtained by removing the dichroic substance described below from the optically anisotropic film according to the embodiment of the present invention and the film obtained by laminating the optically anisotropic film according to the embodiment of the present invention, using the spectra of the in-plane measurement at the obtained orientation.

In the optically anisotropic film according to the embodiment of the present invention, the transmittance of the front surface is preferably 65% or greater, more preferably 70% or greater, and still more preferably 75% or greater. In this manner, the illuminance of the image display device can be increased to enhance the visibility.

Further, from the viewpoint of making the tint in the front direction neutral, the alignment degree of the optically anisotropic film according to the embodiment of the present invention at 420 nm is preferably 0.93 or greater.

The tint of the optical film containing a dichroic substance is typically controlled by adjusting the addition amount of the dichroic substance contained in the film. However, it was found that the tint both in the front direction and an oblique direction cannot be made neutral only by adjusting the addition amount of the dichroic substance. The reason why the tint thereof both in the front direction and an oblique direction cannot be made neutral is found to be that the alignment degree at 420 nm is low, and the tint thereof both in the front direction and an oblique direction can be made neutral by increasing the alignment degree at 420 nm.

[Liquid Crystal Composition]

The optically anisotropic film according to the embodiment of the present invention can be formed by using a liquid crystal composition containing a liquid crystal compound and a dichroic substance.

Further, the liquid crystal composition may contain a solvent, a polymerization initiator, an interface improver, an alignment agent, and other components in addition to the components described above.

Hereinafter, each component will be described.

<Liquid Crystal Compound>

The liquid crystal composition contains a liquid crystal compound. In a case where the composition contains a liquid crystal compound, the dichroic substances can be aligned with a high alignment degree while the precipitation of the dichroic substances is suppressed.

The liquid crystal compound is a liquid crystal compound that does not exhibit dichroism.

As the liquid crystal compound, both a low-molecular-weight liquid crystal compound and a polymer liquid crystal compound can be used, but a polymer liquid crystal compound is more preferable from the viewpoint of obtaining a high alignment degree. Here, "low-molecular-weight liquid crystal compound" indicates a liquid crystal compound having no repeating units in the chemical structure. Here, "polymer liquid crystal compound" indicates a liquid crystal compound having a repeating unit in the chemical structure.

Examples of the low-molecular-weight liquid crystal compound include liquid crystal compounds described in JP2013-228706A.

Examples of the polymer liquid crystal compound include thermotropic liquid crystal polymers described in JP2011-237513A. Further, the polymer liquid crystal compound may contain a crosslinkable group (such as an acryloyl group or a methacryloyl group) at a terminal.

The liquid crystal compound may be used alone or in combination of two or more kinds thereof.

From the viewpoint that the alignment degree of the optically anisotropic film is more excellent, it is preferable that the liquid crystal compound contains a polymer liquid crystal compound.

From the viewpoint that the alignment degree of the dichroic substance is more excellent, it is preferable that the liquid crystal compound is a polymer liquid crystal compound having a repeating unit represented by Formula (3-1) (hereinafter, also referred to as "repeating unit (3-1)").

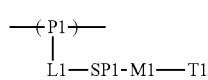

(3-1)

In Formula (3-1), P1 represents the main chain of the repeating unit, L1 represents a single bond or a divalent linking group, SP1 represents a spacer group, M1 represents a mesogen group, and T1 represents a terminal group.

Further, in the repeating unit (3-1), the difference between the log P value of P1, L1, and SP1 and the log P value of M1 is preferably 4 or greater. The difference is still more preferably 4.5 or greater. The repeating unit is in a state in which the compatibility between the mesogen group and the structure from the main chain to the spacer group is low because the log P value of the main chain, L1, and the spacer group and the log P value of the mesogen group are separated by a predetermined value or greater. In this manner, it is assumed that since the crystallinity of the polymer liquid crystal compound increases, the alignment degree of the polymer liquid crystal compound increases. As described above, it is assumed that in a case where the alignment degree of the polymer liquid crystal compound is high, the compatibility between the polymer liquid crystal compound and the dichroic substance is decreased (that is, the crystallinity of the dichroic substance is improved), and thus the alignment degree of the dichroic substance is improved. As a result, it is considered that the alignment degree of the optically anisotropic film to be obtained is increased.

Specific examples of the main chain of the repeating unit represented by P1 include groups represented by Formulae (P1-A) to (P1-D). Among these, from the viewpoints of diversity and handleability of a monomer serving as a raw material, a group represented by Formula (P1-A) is preferable.

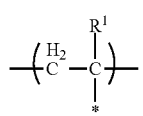

(P1-A)

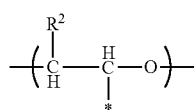

(P1-B)

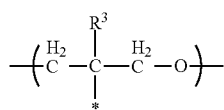

(P1-C)

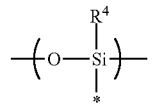

(P1-D)

In Formulae (P1-A) to (P1-D), "*" represents a bonding position with respect to L1 in Formula (3-1).

In Formulae (P1-A) to (P1-D), $R^2$, $R^3$, and $R^4$ each independently represent a hydrogen atom, a halogen atom, a cyano group, an alkyl group having 1 to 10 carbon atoms, or an alkoxy group having 1 to 10 carbon atoms. The alkyl group may be a linear or branched alkyl group or an alkyl group having a cyclic structure (cycloalkyl group). Further, the number of carbon atoms of the alkyl group is preferably in a range of 1 to 5.

It is preferable that the group represented by Formula (P1-A) is a unit of a partial structure of poly(meth)acrylic acid ester obtained by polymerization of (meth)acrylic acid ester.

It is preferable that the group represented by Formula (P1-B) is an ethylene glycol unit formed by ring-opening polymerization of an epoxy group of a compound containing the epoxy group.

It is preferable that the group represented by Formula (P1-C) is a propylene glycol unit formed by ring-opening polymerization of an oxetane group of a compound containing the oxetane group.

It is preferable that the group represented by Formula (P1-D) is a siloxane unit of a polysiloxane obtained by polycondensation of a compound containing at least one of an alkoxysilyl group or a silanol group. Here, examples of the compound containing at least one of an alkoxysilyl group or a silanol group include a compound containing a group represented by Formula $SiR^{14}(OR^{15})_2$. In the formula, $R^{14}$ has the same definition as that for $R^{14}$ in Formula (P1-D), and a plurality of $R^{15}$'s each independently represent a hydrogen atom or an alkyl group having 1 to 10 carbon atoms.

L1 represents a single bond or a divalent linking group.

Examples of the divalent linking group represented by L1 include —C(O)O—, —OC(O)—, —O—, —S—, —C(O)NR³—, —NR³C(O)—, —SO₂—, and —NR³R⁴—. In the formulae, $R^3$ and $R^4$ each independently represent a hydrogen atom or an alkyl group having 1 to 6 carbon atoms which may have a substituent (described below).

In a case where P1 represents a group represented by Formula (P1-A), from the viewpoint that the alignment degree of the optically anisotropic film is more excellent, it is preferable that L1 represents a group represented by —C(O)O—.

In a case where P1 represents a group represented by any of Formulae (P1-B) to (P1-D), from the viewpoint that the alignment degree of the optically anisotropic film is more excellent, it is preferable that L1 represents a single bond.

From the viewpoints of easily exhibiting liquid crystallinity and the availability of raw materials, it is preferable that the spacer group represented by SP1 has at least one structure selected from the group consisting of an oxyethylene structure, an oxypropylene structure, a polysiloxane structure, and an alkylene fluoride structure.

Here, as the oxyethylene structure represented by SP1, a group represented by *—(CH₂—CH₂O)$_{n1}$—* is preferable. In the formula, n1 represents an integer of 1 to 20, and * represents a bonding position with respect to L1 or M1 in Formula (3-1). From the viewpoint that the alignment degree of the optically anisotropic film is more excellent, n1 represents preferably an integer of 2 to 10, more preferably an integer of 2 to 4, and most preferably 3.

Further, from the viewpoint that the alignment degree of the optically anisotropic film is more excellent, a group represented by *—(CH(CH$_3$)—CH$_2$O)$_{n2}$—* is preferable as the oxypropylene structure represented by SP1. In the formula, n2 represents an integer of 1 to 3, and "*" represents a bonding position with respect to L1 or M1.

Further, from the viewpoint that the alignment degree of the optically anisotropic film is more excellent, a group represented by *—(Si(CH$_3$)$_2$—O)$_{n3}$—* is preferable as the polysiloxane structure represented by SP1. In the formula, n3 represents an integer of 6 to 10, and "*" represents a bonding position with respect to L1 or M1.

Further, from the viewpoint that the alignment degree of the optically anisotropic film is more excellent, a group represented by *—(CF$_2$—CF$_2$)$_{n4}$—* is preferable as the alkylene fluoride structure represented by SP1. In the formula, n4 represents an integer of 6 to 10, and "*" represents a bonding position with respect to L1 or M1.

The mesogen group represented by M1 is a group showing a main skeleton of a liquid crystal molecule that contributes to liquid crystal formation. A liquid crystal molecule exhibits liquid crystallinity which is in an intermediate state (mesophase) between a crystal state and an isotropic liquid state. The mesogen group is not particularly limited, and for example, particularly description on pages 7 to 16 of "Flussige Kristalle in Tabellen II" (VEB Deutsche Verlag fur Grundstoff Industrie, Leipzig, 1984) and particularly the description in Chapter 3 of "Liquid Crystal Handbook" (Maruzen, 2000) edited by Liquid Crystal Handbook Editing Committee can be referred to.

As the mesogen group, for example, a group having at least one cyclic structure selected from the group consisting of an aromatic hydrocarbon group, a heterocyclic group, and an alicyclic group is preferable.

From the viewpoint that the alignment degree of the optically anisotropic film is more excellent, the mesogen group contains preferably an aromatic hydrocarbon group, more preferably two to four aromatic hydrocarbon groups, and still more preferably three aromatic hydrocarbon groups.

From the viewpoints of exhibiting the liquid crystallinity, adjusting the liquid crystal phase transition temperature, and the availability of raw materials and synthetic suitability and from the viewpoint that the alignment degree of the optically anisotropic film is more excellent, a group represented by Formula (M1-A) or Formula (M1-B) is preferable, and a group represented by Formula (M1-B) is more preferable as the mesogen group.

(M1-A)

(M1-B)

In Formula (M1-A), A1 represents a divalent group selected from the group consisting of an aromatic hydrocarbon group, a heterocyclic group, and an alicyclic group. These groups may be substituted with an alkyl group, a fluorinated alkyl group, an alkoxy group, or a substituent.

It is preferable that the divalent group represented by A1 is a 4- to 6-membered ring. Further, the divalent group represented by A1 may be a monocycle or a fused ring.

Further, "*" represents a bonding position with respect to SP1 or T1.

Examples of the divalent aromatic hydrocarbon group represented by A1 include a phenylene group, a naphthylene group, a fluorene-diyl group, an anthracene-diyl group, and a tetracene-diyl group. From the viewpoints of design diversity of a mesogenic skeleton and the availability of raw materials, a phenylene group or a naphthylene group is preferable, and a phenylene group is more preferable.

The divalent heterocyclic group represented by A1 may be any of aromatic or non-aromatic, but a divalent aromatic heterocyclic group is preferable as the divalent heterocyclic group from the viewpoint of further improving the alignment degree.

The atoms other than carbon constituting the divalent aromatic heterocyclic group include a nitrogen atom, a sulfur atom, and an oxygen atom. In a case where the aromatic heterocyclic group has a plurality of atoms constituting a ring other than carbon, these may be the same as or different from each other.

Specific examples of the divalent aromatic heterocyclic group include a pyridylene group (pyridine-diyl group), a pyridazine-diyl group, an imidazole-diyl group, a thienylene group (thiophene-diyl group), a quinolylene group (quinoline-diyl group), an isoquinolylene group (isoquinoline-diyl group), an oxazole-diyl group, a thiazole-diyl group, an oxadiazole-diyl group, a benzothiazole-diyl group, a benzothiadiazole-diyl group, a phthalimido-diyl group, a thienothiazole-diyl group, a thiazolothiazole-diyl group, a thienothiophene-diyl group, and a thienooxazole-diyl group.

Specific examples of the divalent alicyclic group represented by A1 include a cyclopentylene group and a cyclohexylene group.

In Formula (M1-A), a1 represents an integer of 1 to 10. In a case where a1 represents 2 or greater, a plurality of A1's may be the same as or different from each other.

In Formula (M1-B), A2 and A3 each independently represent a divalent group selected from the group consisting of an aromatic hydrocarbon group, a heterocyclic group, and an alicyclic group. Specific examples and preferred embodiments of A2 and A3 are the same as those for A1 in Formula (M1-A), and thus description thereof will not be repeated.

In Formula (M1-B), a2 represents an integer of 1 to 10. In a case where a2 represents 2 or greater, a plurality of A2's may be the same as or different from each other, a plurality of A3's may be the same as or different from each other, and a plurality of LA1's may be the same as or different from each other. From the viewpoint that the alignment degree of the optically anisotropic film is more excellent, a2 represents preferably an integer of 2 or greater and more preferably 2.

In Formula (M1-B), in a case where a2 represents 1, LA1 represents a divalent linking group. In a case where a2 represents 2 or greater, a plurality of LA1's each independently represent a single bond or a divalent linking group, and at least one of the plurality of LA1's is a divalent linking group. In a case where a2 represents 2, from the viewpoint that the alignment degree of the optically anisotropic film is more excellent, it is preferable that one of the two LA1's represents a divalent linking group and the other represents a single bond.

In Formula (M1-B), examples of the divalent linking group represented by LA1 include —O—, —(CH$_2$)$_g$—, —(CF$_2$)$_g$—, —Si(CH$_3$)$_2$—, —(Si(CH$_3$)$_2$O)$_g$—, —(OSi(CH$_3$)$_2$)$_g$— (g represents an integer of 1 to 10), —N(Z)—, —C(Z)=C(Z')—, —C(Z)=N—, —N=C(Z)—, —C(Z)₂—C(Z')₂—, —C(O)—, —OC(O)—, —C(O)O—, —O—C(O)O—, —N(Z)C(O)—, —C(O)N(Z)—, —C(Z)=C(Z')—C(O)O—, —O—C(O)—C(Z)=C(Z')—, —C(Z)=N—, —N=C(Z)—, —C(Z)=C(Z')—C(O)N(Z")—, —N(Z")—C(O)—C(Z)=C(Z')—, —C(Z)=C(Z')—C(O)—S—, —S—C(O)—C(Z)=C(Z')—, —C(Z)=N—N=C(Z')—(Z, Z', and Z" each independently represent a hydrogen atom, an alkyl group having 1 to 4 carbon atoms, a cycloalkyl group, an aryl group, a cyano group, or a halogen atom), —C≡C—, —N=N—, —S—, —S(O)—, —S(O)(O)—, —(O)S(O)O—, —O(O)S(O)O—, —SC(O)—, and —C(O)S—.

Among these, from the viewpoint that the alignment degree of the optically anisotropic film is more excellent, —C(O)O— is preferable.

LA1 may represent a group obtained by combining two or more of these groups.

Specific examples of M1 include the following structures. In the following specific examples, "Ac" represents an acetyl group.

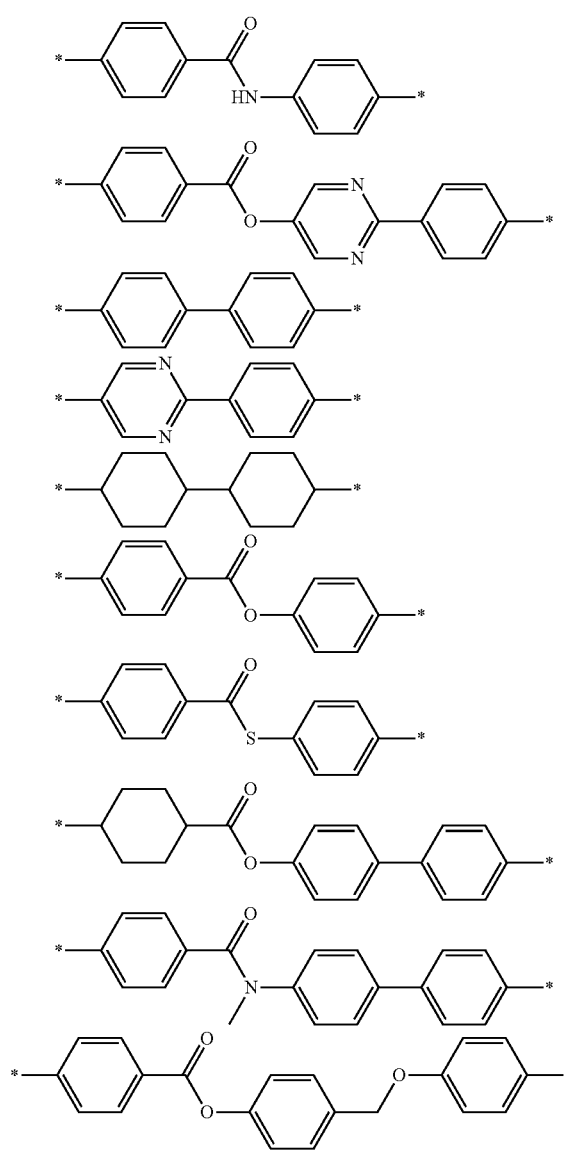

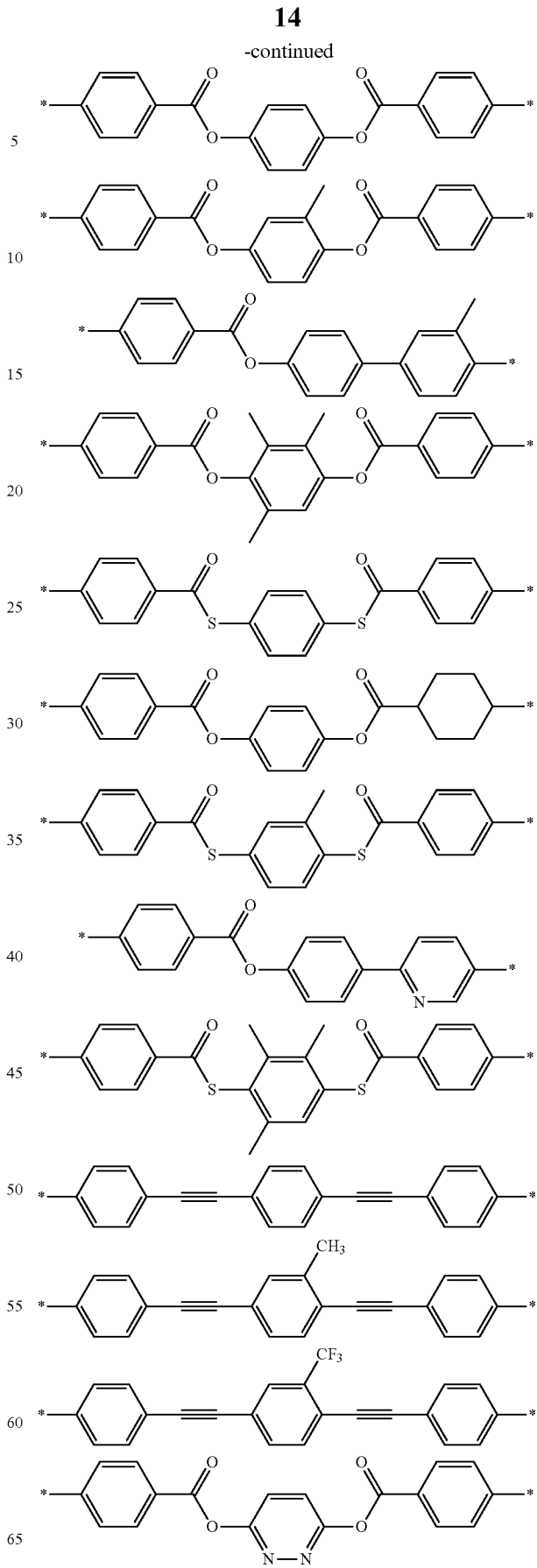

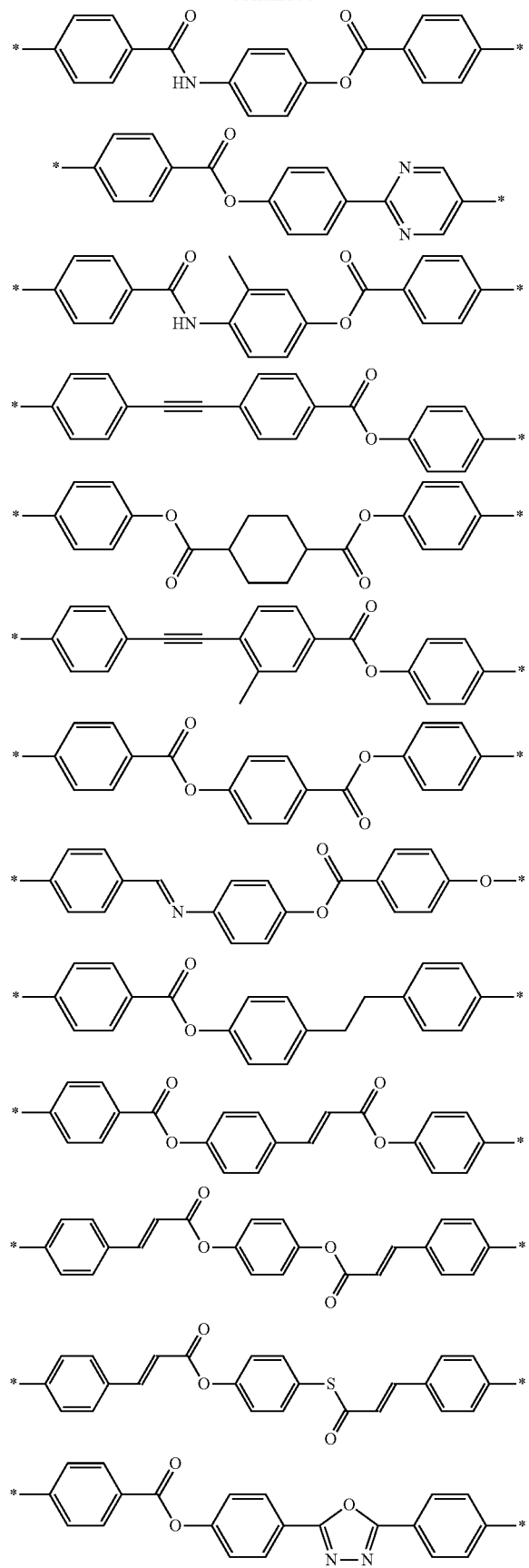
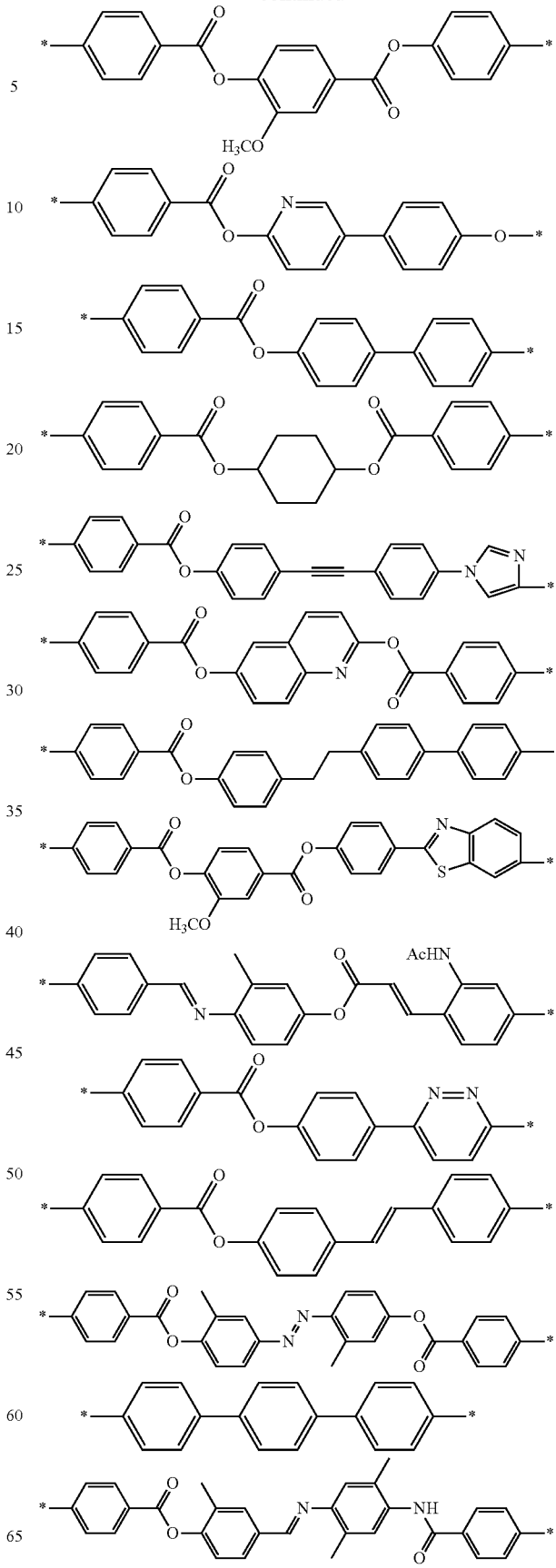

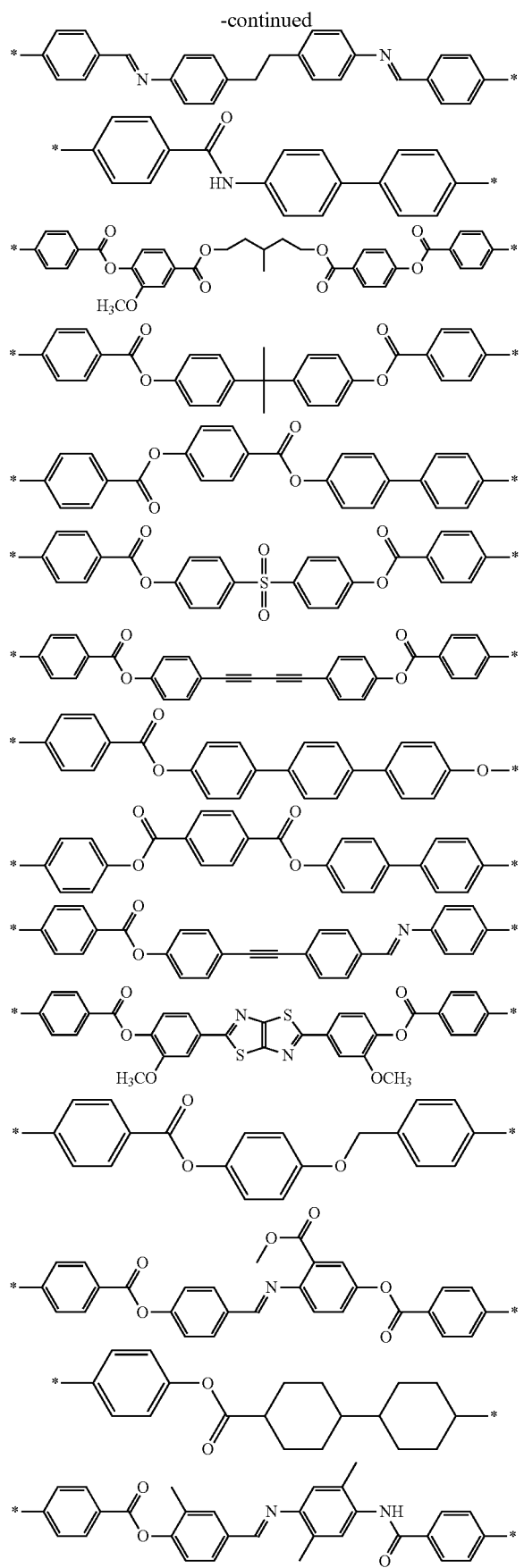

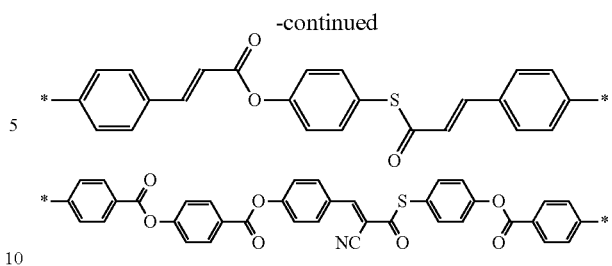

Examples of the terminal group represented by T1 include a hydrogen atom, a halogen atom, a cyano group, a nitro group, a hydroxy group, an alkyl group having 1 to 10 carbon atoms, an alkoxy group having 1 to 10 carbon atoms, an alkylthio group having 1 to 10 carbon atoms, an alkoxycarbonyloxy group having 1 to 10 carbon atoms, an alkoxycarbonyl group having 1 to 10 carbon atoms (ROC(O)—: R represents an alkyl group), an acyloxy group having 1 to 10 carbon atoms, an acylamino group having 1 to 10 carbon atoms, an alkoxycarbonylamino group having 1 to 10 carbon atoms, a sulfonylamino group having 1 to 10 carbon atoms, a sulfamoyl group having 1 to 10 carbon atoms, a carbamoyl group having 1 to 10 carbon atoms, a sulfinyl group having 1 to 10 carbon atoms, a ureido group having 1 to 10 carbon atoms, and a (meth)acryloyloxy group-containing group. Examples of the (meth)acryloyloxy group-containing group include a group represented by -L-A (L represents a single bond or a linking group, specific examples of the linking group are the same as those for L1 and SP1 described above, and A represents a (meth)acryloyloxy group).

From the viewpoint that the alignment degree of the optically anisotropic film is more excellent, T1 represents preferably an alkoxy group having 1 to 10 carbon atoms, more preferably an alkoxy group having 1 to 5 carbon atoms, and still more preferably a methoxy group. These terminal groups may be further substituted with these groups or the polymerizable groups described in JP2010-244038A.

From the viewpoint that the alignment degree of the optically anisotropic film is more excellent, the number of atoms in the main chain of T1 is preferably in a range of 1 to 20, more preferably in a range of 1 to 15, still more preferably in a range of 1 to 10, and particularly preferably in a range of 1 to 7. In a case where the number of atoms in the main chain of T1 is 20 or less, the alignment degree of the optically anisotropic film is further improved. Here, "main chain" in T1 indicates the longest molecular chain bonded to M1, and the number of hydrogen atoms is not included in the number of atoms in the main chain of T1. For example, the number of atoms in the main chain is 4 in a case where T1 represents an n-butyl group, the number of atoms in the main chain is 3 in a case where T1 represents a sec-butyl group.

From the viewpoint that the alignment degree of the optically anisotropic film is more excellent, the content of the repeating unit (3-1) is preferably in a range of 20% to 100% by mass with respect to 100% by mass of all the repeating units of the polymer liquid crystal compound.

In the present invention, the content of each repeating unit contained in the polymer liquid crystal compound is calculated based on the charged amount (mass) of each monomer used for obtaining each repeating unit.

The polymer liquid crystal compound may have only one or two or more kinds of repeating units (3-1). In a case where the polymer liquid crystal compound has two or more kinds of repeating units (3-1), there is an advantage in that the solubility of the polymer liquid crystal compound in a solvent is improved and the liquid crystal phase transition temperature is easily adjusted. In a case where the polymer liquid crystal compound has two or more kinds of repeating units (3-1), it is preferable that the total amount thereof is in the above-described range.

In a case where the polymer liquid crystal compound has two kinds of the repeating units (3-1), from the viewpoint that the alignment degree of the optically anisotropic film is more excellent, it is preferable that the terminal group represented by T1 in one unit (repeating unit A) is an alkoxy group and the terminal group represented by T1 in the other unit (repeating unit B) is a group other than the alkoxy group.

From the viewpoint that the alignment degree of the optically anisotropic film is more excellent, as the terminal group represented by T1 in the repeating unit B, an alkoxycarbonyl group, a cyano group, or a (meth)acryloyloxy group-containing group is preferable, and an alkoxycarbonyl group or a cyano group is more preferable.

From the viewpoint that the alignment degree of the optically anisotropic film is more excellent, the ratio (A/B) of the content of the repeating unit A in the polymer liquid crystal compound to the content of the repeating unit B in the polymer liquid crystal compound is preferably in a range of 50/50 to 95/5, more preferably in a range of 60/40 to 93/7, and still more preferably in a range of 70/30 to 90/10.

<Repeating Unit (3-2)>

The polymer liquid crystal compound of the present invention may further have a repeating unit represented by Formula (3-2) (in the present specification, also referred to as "repeating unit (3-2)"). This provides advantages such as improvement of the solubility of the polymer liquid crystal compound in a solvent and ease of adjustment of the liquid crystal phase transition temperature.

The repeating unit (3-2) is different from the repeating unit (3-1) in terms that the repeating unit (3-2) does not contain at least a mesogen group.

In a case where the polymer liquid crystal compound has the repeating unit (3-2), the polymer liquid crystal compound is a copolymer of the repeating unit (3-1) and the repeating unit (3-2) (or may be a copolymer having the repeating unit A and the repeating unit B) and may be any polymer such as a block polymer, an alternating polymer, a random polymer, or a graft polymer.

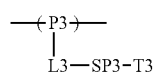

(3-2)

In Formula (3-2), P3 represents the main chain of the repeating unit, L3 represents a single bond or a divalent linking group, SP3 represents a spacer group, and T3 represents a terminal group.

Specific examples of P3, L3, SP3, and T3 in Formula (3-2) are the same as those for P1, L1, SP1, and T1 in Formula (3-1).

Here, from the viewpoint of improving the strength of the optically anisotropic film, it is preferable that T3 in Formula (3-2) contains a polymerizable group.

The content of the repeating unit (3-2) is preferably in a range of 0.5% to 40% by mass and more preferably in a range of 1% to 30% by mass with respect to 100% by mass of all the repeating units of the polymer liquid crystal compound.

The polymer liquid crystal compound may have only one or two or more kinds of repeating units (3-2). In a case where the polymer liquid crystal compound has two or more kinds of repeating units (3-2), it is preferable that the total amount thereof is in the above-described ranges.

(Weight-Average Molecular Weight)

From the viewpoint that the alignment degree of the optically anisotropic film is more excellent, the weight-average molecular weight (Mw) of the polymer liquid crystal compound is preferably in a range of 1000 to 500000 and more preferably in a range of 2000 to 300000. In a case where the Mw of the polymer liquid crystal compound is in the above-described range, the polymer liquid crystal compound is easily handled.

In particular, from the viewpoint of suppressing cracking during the coating, the weight-average molecular weight (Mw) of the polymer liquid crystal compound is preferably 10000 or greater and more preferably in a range of 10000 to 300000.

In addition, from the viewpoint of the temperature latitude of the degree of alignment, the weight-average molecular weight (Mw) of the polymer liquid crystal compound is preferably less than 10000 and more preferably 2000 or greater and less than 10000.

Here, the weight-average molecular weight and the number average molecular weight in the present invention are values measured by the gel permeation chromatography (GPC) method.

Solvent (eluent): N-methylpyrrolidone
Device name: TOSOH HLC-8220GPC
Column: Connect and use three of TOSOH TSKgel Super AWM-H (6 mm×15 cm)
Column temperature: 25° C.
Sample concentration: 0.1% by mass
Flow rate: 0.35 mL/min
Calibration curve: TSK standard polystyrene (manufactured by TOSOH Corporation), calibration curves of 7 samples with Mw of 2800000 to 1050 (Mw/Mn=1.03 to 1.06) are used.

(Content of Liquid Crystal Compound)

The content of the liquid crystal compound is preferably in a range of 30% to 99% by mass, more preferably in a range of 50% to 98% by mass, and particularly preferably in a range of 60% to 95% by mass with respect to the total mass of the solid content of the liquid crystal composition. In a case where the content of the liquid crystal compound is in the above-described ranges, the alignment degree of the optically anisotropic film is further improved.

It is preferable that the content of the liquid crystal compound in the optically anisotropic film with respect to the total mass of optically anisotropic film is the same as the content of the liquid crystal compound with respect to the total mass of the solid content of the liquid crystal composition described above.

<Dichroic Substance>

The liquid crystal composition further contains a dichroic substance.

In the present invention, the dichroic substance indicates a coloring agent having different absorbances depending on the direction. The dichroic substance may or may not exhibit liquid crystallinity.

The other dichroic substances are not particularly limited, and examples thereof include a visible light absorbing material (dichroic coloring agent), a light emitting material (such as a fluorescent material or a phosphorescent material), an ultraviolet absorbing material, an infrared absorbing material, a non-linear optical material, a carbon nanotube, and an inorganic material (for example, a quantum rod). Further, known dichroic substances (dichroic coloring agents) of the related art can be used.

Specific examples thereof include those described in paragraphs [0067] to [0071] of JP2013-228706A, paragraphs [0008] to [0026] of JP2013-227532A, paragraphs [0008] to [0015] of JP2013-209367A, paragraphs [0045] to [0058] of JP2013-14883A, paragraphs [0012] to [0029] of JP2013-109090A, paragraphs [0009] to [0017] of JP2013-101328A, paragraphs [0051] to [0065] of JP2013-37353A, paragraphs [0049] to [0073] of JP2012-63387A, paragraphs [0016] to [0018] of JP1999-305036A (JP-H11-305036A), paragraphs [0009] to [0011] of JP2001-133630A, paragraphs [0030] to [0169] of JP2011-215337A, paragraphs [0021] to [0075] of JP2010-106242A, paragraphs [0011] to [0025] of JP2010-215846A, paragraphs [0017] to [0069] of JP2011-048311A, paragraphs [0013] to [0133] of JP2011-213610A, paragraphs [0074] to [0246] of JP2011-237513A, paragraphs [0005] to [0051] of JP2016-006502A, paragraphs [0014] to [0032] of JP2018-053167A, paragraphs [0014] to [0033] of JP2020-11716A, paragraphs [0005] to [0041] of WO2016/060173A, paragraphs [0008] to [0062] of WO2016/136561A, paragraphs [0014] to [0033] of WO2017/154835A, paragraphs [0014] to [0033] of WO2017/154695A, paragraphs [0013] to [0037] of WO2017/195833A, paragraphs [0014] to [0034] of WO2018/164252A, paragraphs [0021] to [0030] of WO2018/186503A, paragraphs [0043] to [0063] of WO2019/189345A, paragraphs [0043] to [0085] of WO2019/225468A, and paragraphs [0050] to [0074] of WO2020/004106A.

Further, specific examples of the dichroic substance also include the followings.

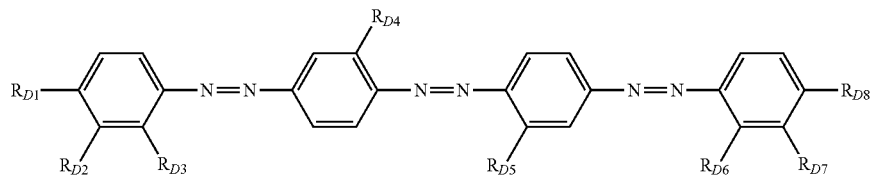

| No | $R_{D1}$ | $R_{D2}$ | $R_{D3}$ | $R_{D4}$ | $R_{D5}$ | $R_{D6}$ | $R_{D7}$ | $R_{D8}$ |
|---|---|---|---|---|---|---|---|---|
| D1 | $OC_4H_8C(O)OCH_2CH_3$ | H | H | H | $CH_3$ | H | H | $OC_4H_8C(O)OCH_2CH_3$ |
| D2 | $OC_4H_8C(O)OCH_3$ | H | H | H | $CH_3$ | H | H | $OC_4H_8C(O)OCH_3$ |
| D3 | $OC_4H_8C(O)OCH_2CH_3$ | H | H | H | $CH_3$ | H | H | $OC_{11}H_{23}$ |
| D4 | $OC_4H_8C(O)OCH_2CH_3$ | H | H | H | $CH_3$ | H | H | $OC_5H_{11}$ |
| D5 | $OC_4H_8C(O)OCH_2CH_3$ | H | H | H | $CH_3$ | H | H | $OCH_2CH_3$ |
| D6 | $OC_4H_8C(O)OCH_2CH_3$ | H | H | H | $CH_3$ | H | Cl | $OC_4H_8C(O)OCH_2CH_3$ |
| D7 | $OC_3H_6C(O)OCH_2CH_3$ | H | H | H | $CH_3$ | H | H | $OC_3H_6C(O)OCH_2CH_3$ |
| D8 | $OC_3H_6C(O)OCH_2CH_3$ | H | H | Cl | H | Cl | H | $OC_3H_6C(O)OCH_2CH_3$ |
| D9 | $OC_9H_{18}C(O)OCH_2CH_3$ | H | H | H | $CH_3$ | H | H | $OC_9H_{18}C(O)OCH_2CH_3$ |
| D10 | $OC_4H_8C(O)OCH_2CH=CH_2$ | H | H | H | $CH_3$ | H | H | $OC_4H_8C(O)OCH_2CH=CH_2$ |
| D11 | $OC_4H_8C(O)OCH_3$ | H | H | H | Cl | H | H | $OC_4H_8C(O)OCH_2CH_3$ |
| D12 | $OC_6H_4C(O)OCH_2CH_3$ | H | H | H | $CH_3$ | H | H | $OC_6H_4C(O)OCH_2CH_3$ |

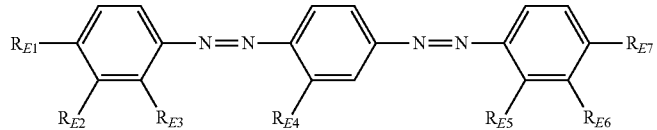

| No | $R_{E1}$ | $R_{E2}$ | $R_{E3}$ | $R_{E4}$ | $R_{E5}$ | $R_{E6}$ | $R_{E7}$ |
|---|---|---|---|---|---|---|---|
| E1 | $OC_4H_8C(O)OCH_2CH_3$ | H | H | H | H | H | $OC_4H_8C(O)OCH_2CH_3$ |
| E2 | $OC_4H_8C(O)OCH_3$ | H | H | H | H | H | $OC_4H_8C(O)OCH_3$ |
| E3 | $OC_4H_8C(O)OCH_2CH_3$ | Cl | H | H | H | Cl | $OC_4H_8C(O)OCH_2CH_3$ |
| E4 | $OC_4H_8C(O)OCH_2CH_3$ | H | H | H | H | Cl | $OC_5H_{11}$ |
| E5 | $OC_4H_8C(O)OCH_2CH_3$ | H | H | $CH_3$ | H | H | $OCH_2CH_3$ |
| E6 | $OC_3H_6C(O)OCH_2CH_3$ | H | H | H | H | H | $OC_3H_6C(O)OCH_2CH_3$ |
| E7 | $OC_9H_{18}C(O)OCH_2CH_3$ | H | H | H | H | H | $OC_9H_{18}C(O)OCH_2CH_3$ |
| E8 | $OC_4H_8C(O)OCH_2CH=CH_2$ | H | H | H | H | H | $OC_4H_8C(O)OCH_2CH=CH_2$ |

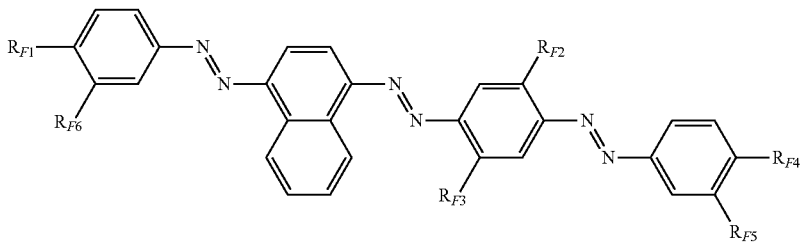

| No | $R_{F1}$ | $R_{F2}$ | $R_{F3}$ | $R_{F4}$ | $R_{F5}$ | $R_{F6}$ |
|---|---|---|---|---|---|---|
| F1 | $OC_4H_8C(O)OCH_2CH_3$ | H | H | $OC_4H_8C(O)OCH_2CH_3$ | H | H |
| F2 | $OC_4H_8C(O)OCH_3$ | H | $CH_3$ | $OC_4H_8C(O)OCH_3$ | H | H |
| F3 | $OC_3H_6C(O)OCH_2CH_3$ | H | H | $OC_3H_6C(O)OCH_2CH_3$ | H | Cl |

In the present invention, two or more kinds of dichroic substances may be used in combination. For example, from the viewpoint of making the color of the optically anisotropic film to be formed closer to black, it is preferable that at least one dichroic substance having a maximum absorption wavelength in a wavelength range of 370 to 550 nm and at least one dichroic substance having a maximum absorption wavelength in a wavelength range of 500 to 700 nm are used in combination.

From the viewpoint that the effects of the present invention are more excellent, the content of the dichroic substance is preferably in a range of 7% to 70% by mass, more preferably in a range of 10% to 60% by mass, and still more preferably in a range of 13% to 50% by mass with respect to the total solid content (100% by mass) of the liquid crystal composition. Further, in a case where a plurality of dichroic substances are used in combination, it is preferable that the total amount of the plurality of dichroic substances is in the above-described ranges.

<Solvent>

From the viewpoint of workability, it is preferable that the liquid crystal composition contains a solvent.

Examples of the solvent include organic solvents such as ketones (such as acetone, 2-butanone, methyl isobutyl ketone, cyclopentanone, cyclohexanone, or acetylacetone), ethers (such as dioxane, tetrahydrofuran, tetrahydropyran, dioxolane, tetrahydrofurfuryl alcohol, cyclopentyl methyl ether, or dibutyl ether), aliphatic hydrocarbons (such as hexane), alicyclic hydrocarbons (such as cyclohexane), aromatic hydrocarbons (such as benzene, toluene, xylene, tetralin, or trimethylbenzene), carbon halides (such as dichloromethane, trichloromethane (chloroform), dichloroethane, dichlorobenzene, 1,1,2,2-tetrachloroethane, or chlorotoluene), esters (such as methyl acetate, ethyl acetate, butyl acetate, diethyl carbonate, ethyl acetoacetate, n-pentyl acetate, ethyl benzoate, benzyl benzoate, butyl carbitol acetate, diethylene glycol monoethyl ether acetate, or iso-amyl acetate), alcohols (such as ethanol, isopropanol, butanol, cyclohexanol, furfuryl alcohol, 2-ethylhexanol, octanol, benzyl alcohol, ethanolamine, ethylene glycol, propylene glycol, diethylene glycol, diethylene glycol monomethyl ether, diethylene glycol monoethyl ether, or diethylene glycol monobutyl ether), phenols (such as phenol or cresol), cellosolves (such as methyl cellosolve, ethyl cellosolve, or 1,2-dimethoxyethane), cellosolve acetates, sulfoxides (such as dimethyl sulfoxide), amides (such as dimethylformamide, dimethylacetamide, N-methylpyrrolidone, N-ethylpyrrolidone, or 1,3-dimethyl-2-imidazolidinone), and heterocyclic compounds (such as pyridine or 2,6-lutidine), and water.

These solvents may be used alone or in combination of two or more kinds thereof.

Further, from the viewpoint that the dichroic substance easily forms an arrangement structure, the contrast of the optically anisotropic film to be formed is further increased, and the light fastness thereof is further improved, the solvent has a boiling point of preferably 70° C. or higher, more preferably 125° C. or higher, and still more preferably 180° C. or higher.

Further, in a case where two or more kinds of solvents are used in combination, the solvents include preferably a solvent having a boiling point of 70° C. or higher, more preferably a solvent having a boiling point of 125° C. or higher, and particularly preferably a solvent having a boiling point of 180° C. or higher.

Further, in a case where two or more kinds of solvents are used in combination, it is preferable to use a solvent having a boiling point of lower than 180° C. and a solvent having a boiling point of 180° C. or higher. The mass ratio between the total amount of the solvent having a boiling point of lower than 180° C. and the total amount of the solvent having a boiling point of 180° C. or higher is preferably in a range of 1:1 to 30:1, more preferably in a range of 2:1 to 20:1, and still more preferably in a range of 3:1 to 15:1.

Further, the reason why the dichroic substance easily forms an arrangement structure by using the solvents having the boiling points described above is not clear, but the present inventors speculate as follows.

First, in regard to the arrangement structure of the dichroic substance, it is considered that the dichroic substance forms an arrangement structure while moving in the film in a process in which the liquid crystal compound is aligned in the optically anisotropic film in a liquid crystal state. Therefore, it is assumed that in a case where the solvents include such a solvent having a high boiling point as described above, the solvent is likely to remain, the dichroic substance is likely to move in the film, and as a result, an arrangement structure is easily formed.

Among these solvents, from the viewpoint that the length L of the major axis of the arrangement structure is easily adjusted, the contrast of the optically anisotropic film to be formed is further increased, and the light fastness is further improved, it is preferable to use an organic solvent and more preferable to use at least one organic solvent having a boiling point of 140° C. or higher (high-boiling point solvent). The upper limit of the boiling point of the high-boiling point solvent is not particularly limited, but is typically 300° C. or lower and preferably 250° C. or lower.

As the high-boiling point solvent, the above-described ketones, aromatic hydrocarbons, carbon halides, esters, alcohols, cellosolves, sulfoxides, heterocyclic compounds, and amides are preferably used, and xylene, tetralin, 1,1,2,2-tetrachloroethane, ethyl acetoacetate, n-pentyl acetate, isoamyl acetate, benzyl alcohol, acetylacetone, hexanol, octanol, furfuryl alcohol, 2-ethylhexanol, ethanolamine, ethylene glycol, propylene glycol, butyl carbitol acetate, diethylene glycol monomethyl ether, diethylene glycol monoethyl ether acetate, cyclohexanol, diethylene glycol, diethylene glycol monobutyl ether, ethyl benzoate, benzyl benzoate, dibutyl ether, phenol, cresol, dimethylacetamide, dimethylformamide, N-ethylpyrrolidone, dimethyl sulfoxide, pyridine, and 2,6-lutidine are more preferably used.

In a case where the liquid crystal composition contains a solvent, from the viewpoint of further increasing the alignment degree of the optically anisotropic film to be formed and further improving the heat resistance, the content of the solvent is preferably in a range of 60% to 99.5% by mass, more preferably in a range of 70% to 99% by mass, and particularly preferably in a range of 75% to 98% by mass with respect to the total mass (100% by mass) of the liquid crystal composition.

<Polymerization Initiator>

The liquid crystal composition may contain a polymerization initiator.

The polymerization initiator is not particularly limited, but a compound having photosensitivity, that is, a photopolymerization initiator is preferable.

As the photopolymerization initiator, various compounds can be used without any particular limitation. Examples of the photopolymerization initiator include α-carbonyl compounds (U.S. Pat. Nos. 2,367,661A and 2,367,670A), acyloin ether (U.S. Pat. No. 2,448,828A), α-hydrocarbon-substituted aromatic acyloin compounds (U.S. Pat. No. 2,722,512A), polynuclear quinone compounds (U.S. Pat. Nos. 3,046,127A and 2,951,758A), a combination of a triarylimidazole dimer and a p-aminophenyl ketone (U.S. Pat. No. 3,549,367A), acridine and phenazine compounds (JP1985-105667A (JP-S60-105667A) and U.S. Pat. No. 4,239,850A), oxadiazole compounds (U.S. Pat. No. 4,212,970A), o-acyloxime compounds (paragraph [0065] of JP2016-27384A), and acylphosphine oxide compounds (JP1988-40799B (JP-S63-40799B), JP1993-29234B (JP-H5-29234B), JP1998-95788A (JP-H10-95788A), and JP1998-29997A (JP-H10-29997A)).

Commercially available products can also be used as such a photopolymerization initiator, and examples thereof include IRGACURE 184, IRGACURE 907, IRGACURE 369, IRGACURE 651, IRGACURE 819, IRGACURE OXE-01, and IRGACURE OXE-02 (all manufactured by BASF SE).

In a case where the liquid crystal composition contains a polymerization initiator, from the viewpoint of further increasing the alignment degree of the optically anisotropic film to be formed and further improving the heat resistance, the content of the polymerization initiator is preferably in a range of 0.01% to 30% by mass and more preferably in a range of 0.1% to 15% by mass with respect to the total solid content (100% by mass) of the liquid crystal composition.

Polymerizable Compound

The liquid crystal composition may contain a polymerizable compound.

Examples of the polymerizable compound include a compound containing an acrylate (such as a (meth)acrylate monomer).

In a case where the liquid crystal composition contains a polymerizable compound, from the viewpoint that the effects of the present invention are more excellent, the content of the polymerizable compound is preferably in a range of 0.5% to 50% by mass and more preferably in a range of 1.0% to 40% by mass with respect to the total solid content (100% by mass) of the liquid crystal composition.

<Interface Improver>

It is preferable that the liquid crystal composition contains an interface improver.

In a case where the liquid crystal composition contains an interface improver, the smoothness of the coated surface is improved, the alignment degree is improved, and cissing and unevenness are suppressed so that the in-plane uniformity is expected to be improved.

Further, fluorine (meth)acrylate-based polymers described in [0018] to [0043] of JP2007-272185A can also be used as the interface improver. Compounds other than the compounds described above may be used as the interface improver. The interface improver may be used alone or in combination of two or more kinds thereof.

In a case where the liquid crystal composition contains an interface improver, the content of the interface improver in the liquid crystal composition is preferably in a range of 0.1% to 2.0% by mass and more preferably in a range of 0.1% to 1.0% by mass with respect to the total mass of the solid content of the liquid crystal composition.

In a case where the optically anisotropic film contains an interface improver, it is preferable that the content of the interface improver with respect to the total mass of the optically anisotropic film is the same as the content of the interface improver with respect to the total mass of the solid content of the liquid crystal composition.

<Alignment Agent>

The liquid crystal composition may contain an alignment agent.

Specific examples of the alignment agent include a vertical alignment agent such as a boronic acid compound or an onium salt.

As the boronic acid compound, a compound represented by Formula (30) is preferable.

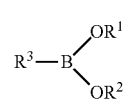

Formula (30)

In Formula (30), $R^1$ and $R^2$ each independently represent a hydrogen atom, a substituted or unsubstituted aliphatic hydrocarbon group, a substituted or unsubstituted aryl group, or a substituted or unsubstituted heterocyclic group.

$R^3$ represents a substituent containing a (meth)acryl group.

Specific examples of the boronic acid compound include a boronic acid compound represented by General Formula (I) described in paragraphs 0023 to 0032 of JP2008-225281A.

As the boronic acid compound, compounds shown below are also preferable.

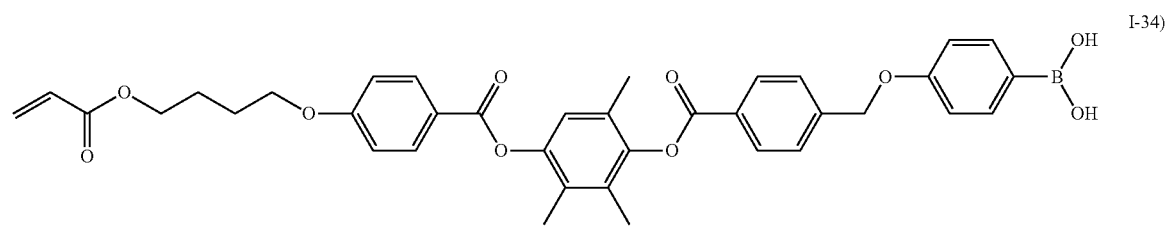

I-34)

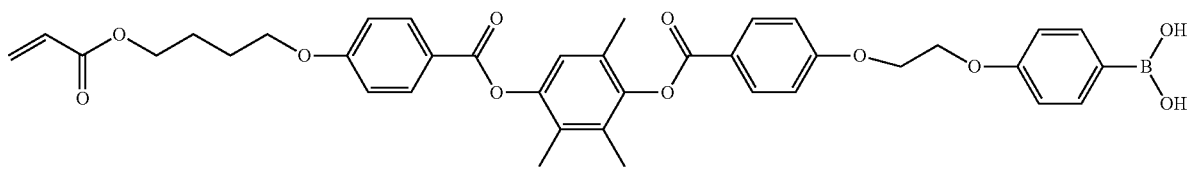

I-35)

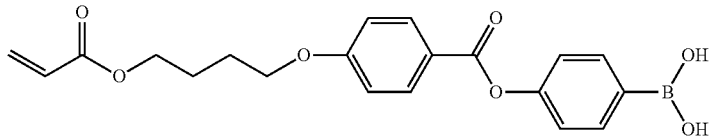

I-36)

As the onium salt, a compound represented by Formula (31) is preferable.

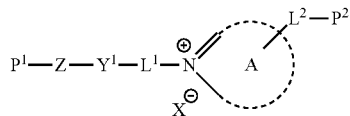

Formula (31)

In Formula (31), the ring A represents a quaternary ammonium ion consisting of a nitrogen-containing heterocyclic ring. X represents an anion. $L^1$ represents a divalent linking group. $L^2$ represents a single bond or a divalent linking group. $Y^1$ represents a divalent linking group having a 5- or 6-membered ring as a partial structure. Further, Z represents a divalent linking group containing an alkylene group having 2 to 20 carbon atoms as a partial structure. Further, $P^1$ and $P^2$ each independently represent a monovalent substituent having a polymerizable ethylenically unsaturated bond.

Specific examples of the onium salt include the onium salts described in paragraphs 0052 to 0058 of JP2012-208397A, the onium salts described in paragraphs 0024 to 0055 of JP2008-026730A, and the onium salts described in JP2002-37777A.

In a case where the liquid crystal composition contains an alignment agent, the content of the alignment agent in the liquid crystal composition is preferably in a range of 0.1% to 40% by mass and more preferably in a range of 0.3% to 20% by mass with respect to the total solid content (100% by mass) of the liquid crystal composition.

Further, the alignment agent may be used alone or in combination of two or more kinds thereof. In a case where two or more kinds of alignment agents are used, it is preferable that the total amount thereof is in the above-described ranges.

[Method of Producing Optically Anisotropic Film]

The method of producing the optically anisotropic film according to the embodiment of the present invention is not particularly limited, but a method of sequentially performing a step of coating an alignment film with the above-described liquid crystal composition to form a coating film (hereinafter, also referred to as "coating film forming step") and a step of aligning liquid crystal components contained in the coating film (hereinafter, also referred to as "aligning step") in this order (hereinafter, also referred to as "present production method") is preferable from the viewpoint that the alignment degree of the optically anisotropic film to be obtained is further increased.

Further, the liquid crystal component is a component that contains not only the liquid crystal compound described above but also a dichroic substance having liquid crystallinity.

Hereinafter, each step will be described.

<Coating Film Forming Step>

The coating film forming step is a step of coating the alignment film with the above-described liquid crystal composition to form a coating film. The liquid crystal compound in the coating film is vertically aligned due to an interaction between the alignment film and the vertical alignment agent (in a case where the liquid crystal composition contains a vertical alignment agent).

The alignment film is easily coated with the liquid crystal composition by using the liquid crystal composition containing the above-described solvent or using a liquid-like material such as a melt obtained by heating the liquid crystal composition.

Examples of the method of coating the base material with the liquid crystal composition include known methods such as a roll coating method, a gravure printing method, a spin coating method, a wire bar coating method, an extrusion coating method, a direct gravure coating method, a reverse gravure coating method, a die coating method, a spraying method, and an ink jet method.

Alignment Film

An alignment film may be any film as long as the film allows the liquid crystal compound contained in the liquid crystal composition to be vertically aligned.

An alignment film can be provided by means such as a rubbing treatment performed on a film surface of an organic compound (preferably a polymer), oblique vapor deposition of an inorganic compound, formation of a layer having microgrooves, or accumulation of an organic compound (such as ω-tricosanoic acid, dioctadecylmethylammonium chloride, or methyl stearate) using a Langmuir-Blodgett method (LB film). Further, an alignment film in which an orientation function is generated by application of an electric field, application of a magnetic field, or irradiation with light is also known. Among these, in the present invention, an alignment film formed by performing a rubbing treatment is preferable from the viewpoint of easily controlling the pretilt angle of the alignment film, and a photo-alignment film formed by irradiation with light is also preferable from the viewpoint of the uniformity of alignment.

(1) Rubbing Treatment Alignment Film

A polymer material used for the alignment film formed by performing a rubbing treatment is described in a plurality of documents, and a plurality of commercially available products can be used. In the present invention, polyvinyl alcohol or polyimide and derivatives thereof are preferably used. The alignment film can refer to the description on page 43, line 24 to page 49, line 8 of WO2001/88574A1. The thickness of the alignment film is preferably in a range of 0.01 to 10 μm and more preferably in a range of 0.01 to 1 μm.

(2) Photo-Alignment Film

A photo-alignment material used for an alignment film formed by irradiation with light is described in a plurality of documents. In the present invention, preferred examples thereof include azo compounds described in JP2006-285197A, JP2007-76839A, JP2007-138138A, JP2007-94071A, JP2007-121721A, JP2007-140465A, JP2007-156439A, JP2007-133184A, JP2009-109831A, JP3883848B, and JP4151746B, aromatic ester compounds described in JP2002-229039A, maleimide and/or alkenyl-substituted nadiimide compounds having a photo-alignment unit described in JP2002-265541A and JP2002-317013A, photocrosslinkable silane derivatives described in JP4205195B and JP4205198B, and photocrosslinkable polyimides, polyamides, or esters described in JP2003-520878A, JP2004-529220A, and JP4162850B. Among these, the azo compounds, the photocrosslinkable polyimides, the polyamides, or the esters are more preferable.

The photo-alignment film formed of the above-described material is irradiated with linearly polarized light or non-polarized light to produce a photo-alignment film.

In the present specification, "irradiation with linearly polarized light" and "irradiation with non-polarized light" are operations for causing a photoreaction in the photo-alignment material. The wavelength of the light to be used varies depending on the photo-alignment material to be used and is not particularly limited as long as the wavelength is required for the photoreaction. The peak wavelength of light to be used for irradiation with light is preferably in a range of 200 nm to 700 nm, and ultraviolet light having a peak wavelength of 400 nm or less is more preferable.

Examples of the light source used for light irradiation include commonly used light sources, for example, lamps such as a tungsten lamp, a halogen lamp, a xenon lamp, a xenon flash lamp, a mercury lamp, a mercury xenon lamp, and a carbon arc lamp, various lasers [such as a semiconductor laser, a helium neon laser, an argon ion laser, a helium cadmium laser, and a yttrium aluminum garnet (YAG) laser], a light emitting diode, and a cathode ray tube.

As means for obtaining linearly polarized light, a method of using a polarizing plate (for example, an iodine polarizing plate, a dichroic substance polarizing plate, or a wire grid polarizing plate), a method of using a prism-based element (for example, a Glan-Thompson prism) or a reflective type polarizer for which a Brewster's angle is used, or a method of using light emitted from a laser light source having polarized light can be employed. Further, only light having a required wavelength may be selectively applied using a filter, a wavelength conversion element, or the like.

In a case where light to be applied is linearly polarized light, a method of applying light vertically or obliquely to the upper surface of the alignment film or the surface of the alignment film from the rear surface is employed. The incidence angle of light varies depending on the photo-alignment material, but is preferably in a range of 0° to 900 (vertical) and more preferably in a range of 40° to 90°.

In a case where light to be applied is non-polarized light, the alignment film is irradiated with non-polarized light obliquely. The incidence angle is preferably in a range of 10° to 80°, more preferably in a range of 20° to 60°, and particularly preferably in a range of 30° to 50°.

The irradiation time is preferably in a range of 1 minute to 60 minutes and more preferably in a range of 1 minute to 10 minutes.

In a case where patterning is required, a method of performing irradiation with light using a photomask as many times as necessary for pattern preparation or a method of writing a pattern by laser light scanning can be employed.

<Aligning Step>

The aligning step is a step of aligning the dichroic substance contained in the coating film. In this manner, the optically anisotropic film according to the embodiment of the present invention can be obtained. In the aligning step, the dichroic substance is considered to be aligned along the liquid crystal compound aligned by the alignment film.

The aligning step may include a drying treatment. Components such as a solvent can be removed from the coating film by performing the drying treatment. The drying treatment may be performed by a method of allowing the coating film to stand at room temperature for a predetermined time (for example, natural drying) or a method of heating the coating film and/or blowing air to the coating film.

Here, the dichroic substance contained in the liquid crystal composition may be aligned by performing the above-described coating film forming step or drying treatment. For example, in an embodiment in which the liquid crystal composition is prepared as a coating solution containing a solvent, the optically anisotropic film according to the embodiment of the present invention may be obtained by drying the coating film and removing the solvent from the coating film so that the dichroic substance contained in the coating film is aligned.

It is preferable that the aligning step includes a heat treatment. In this manner, the dichroic substance contained in the coating film is more aligned, and the alignment degree of the optically anisotropic film to be obtained is further increased.

From the viewpoint of the manufacturing suitability, the heating temperature is preferably in a range of 10° C. to 250° C. and more preferably 25° C. to 190° C. Further, the heating time is preferably in a range of 1 to 300 seconds and more preferably in a range of 1 to 60 seconds.

The aligning step may include a cooling treatment performed after the heat treatment. The cooling treatment is a treatment of cooling the coating film after being heated to room temperature (20° C. to 25° C.). In this manner, the alignment of the dichroic substance contained in the coating film is further fixed, and the alignment degree of the optically anisotropic film to be obtained is further increased. The cooling means is not particularly limited and can be performed according to a known method.

The optically anisotropic film according to the embodiment of the present invention can be obtained by performing the above-described steps.

In the present invention, as the technique of aligning the dichroic substance in a desired direction, a technique of preparing a polarizer formed of a dichroic substance or a technique of preparing a guest-host liquid crystal cell can be referred to. For example, techniques used in the method of preparing a dichroic polarizer described in JP1999-305036A (JP-H11-305036A) or JP2002-90526A and the method of preparing a guest-host type liquid crystal display device described in JP2002-99388A or JP2016-27387A can also be used for preparation of the optically anisotropic film according to the embodiment of the present invention.

For example, the dichroic substance can be desirably aligned as described above in association with the alignment of host liquid crystals using the technique of the guest-host type liquid crystal cell. Specifically, the optically anisotropic film according to the embodiment of the present invention can be prepared by mixing a dichroic substance serving as a guest and a rod-like liquid crystal compound serving as a host liquid crystal, aligning the host liquid crystal, aligning molecules of the dichroic substance along the alignment of the liquid crystal molecules, and fixing the alignment state.

In order to prevent fluctuation in the light absorption characteristics of the optically anisotropic film used in the present invention due to the use environment, it is preferable that the alignment of the dichroic substance is fixed by forming a chemical bond. For example, the alignment can be fixed by promoting the polymerization of the host liquid crystal, the dichroic substance, and the polymerizable component to be added as desired.

Further, a polymer film that satisfies the light absorption characteristics required for the optically anisotropic film used in the present invention can be prepared by allowing the dichroic substance to permeate into the polymer film and aligning the dichroic substance along the alignment of the polymer molecules in the polymer film. Specifically, a surface of a polymer film is coated with a solution of the dichroic substance so that the solution is allowed to permeate into the film, thereby preparing a polymer film. The alignment of the dichroic substance can be adjusted by the alignment of a polymer chain in the polymer film, the properties thereof (chemical and physical properties of the polymer chain, a functional group of the polymer chain, and the like), the coating method, and the like. The details of this method are described in JP2002-90526A.

<Other Steps>

The present production method may include a step of curing the optically anisotropic film after the aligning step (hereinafter, also referred to as "curing step").

The curing step is performed by, for example, heating the film and/or irradiating (exposing) the film with light. Between these, it is preferable that the curing step is performed by irradiating the film with light.

Various light sources such as infrared rays, visible light, and ultraviolet rays can be used as the light source for curing, but ultraviolet rays are preferable. In addition, ultraviolet rays may be applied while the film is heated during curing, or ultraviolet rays may be applied through a filter that transmits only a specific wavelength.

Further, the exposure may be performed under a nitrogen atmosphere. In a case where the curing of the optically anisotropic film proceeds by radical polymerization, since the inhibition of polymerization by oxygen is reduced, it is preferable that exposure is performed in a nitrogen atmosphere.

Optical Film

An optical film according to the embodiment of the present invention includes a transparent film base material and the above-described optically anisotropic film disposed on the transparent film base material.

Further, the optical film according to the embodiment of the present invention may include an alignment film between the transparent film base material and the optically anisotropic film.

Further, the optical film according to the embodiment of the present invention may further include a polarizer having an absorption axis in a plane. It is preferable that the polarizer is disposed on a side of the optically anisotropic film opposite to the transparent film base material. The polarizer may be disposed in contact with the surface of the optically anisotropic film or may be disposed on the surface of the optically anisotropic film via another layer (for example, a known adhesive layer or a known pressure sensitive adhesive layer). In a case where the optical film according to the embodiment of the present invention includes the polarizer, it is preferable that the optical film according to the embodiment of the present invention is a viewing angle control film used to control a viewing angle.

Hereinafter, each member constituting the optical film according to the embodiment of the present invention will be described.

[Transparent Film Base Material]

As the transparent film base material, a known transparent resin film such as a transparent resin plate, a transparent resin sheet, or the like can be used without particular limitation. Examples of the transparent resin film include a cellulose acylate film (such as a cellulose triacetate film (refractive index of 1.48), a cellulose diacetate film, a cellulose acetate butyrate film, or a cellulose acetate propionate film), a polyethylene terephthalate film, a polyether sulfone film, a polyacrylic resin film, a polyurethane-based resin film, a polyester film, a polycarbonate film, a polysulfone film, a polyether film, a polymethylpentene film, a polyether ketone film, and a (meth)acrylonitrile film.

Among these, a cellulose acylate film which is highly transparent, has a small optical birefringence, is easily produced, and is typically used as a protective film of a polarizing plate is preferable, and a cellulose triacetate film is particularly preferable.

The thickness of the transparent film base material is typically in a range of 20 μm to 100 μm.

In the present invention, it is particularly preferable that the transparent film base material is a cellulose ester-based film having a film thickness 20 to 70 μm.

[Optically Anisotropic Film]

Since the optically anisotropic film according to the embodiment of the present invention is as described above, the description thereof will not be repeated.

[Alignment Film]

Since the alignment film (alignment layer) is as described above, the description thereof will not be repeated.

[Barrier Layer]

It is preferable that the optical film according to the embodiment of the present invention includes a barrier layer together with the transparent film base material and the optically anisotropic layer.

Here, the barrier layer is also referred to as a gas-shielding layer (oxygen-shielding layer) and has a function of protecting the polarizer of the present invention from gas such as oxygen in the atmosphere, the moisture, or the compound contained in an adjacent layer.

The barrier layer can refer to, for example, the description in paragraphs [0014] to [0054] of JP2014-159124A, paragraphs [0042] to [0075] of JP2017-121721A, paragraphs [0045] to [0054] of JP2017-115076A, paragraphs [0010] to [0061] of JP2012-213938A, and paragraphs [0021] to [0031] of JP2005-169994A.

[Tint Adjusting Layer]

It is preferable that the optical film according to the embodiment of the present invention includes a tint adjusting layer containing at least one coloring agent compound. It is preferable that the coloring agent compound contained in the tint adjusting layer is in a non-aligned state.

In a case where the amount of the coloring agent in the optically anisotropic layer is adjusted, a change in tint as viewed in an oblique direction with respect to the transmittance central axis is increased, but the change in tint in the oblique direction with respect to the change in tint of the transmittance central axis can be suppressed by adjusting the tint using the tint adjusting layer.

The tint adjusting layer may have only the function of the tint adjusting layer or may have functions integrated with functions of other layers.

The absorption peak wavelength of the coloring agent compound contained in the tint adjusting layer used in the present invention is preferably 500 nm or greater and 650 nm or less and more preferably 550 nm or greater and 600 nm or less. The tint of the optical film in the present invention can be adjusted to be more neutral by setting the absorption of the coloring agent compound to be in the above-described ranges.

Examples of the coloring agent compound contained in the tint adjusting layer include azo, methine, anthraquinone, triarylmethane, oxazine, azomethine, phthalocyanine, porphyrin, perylene, pyrrolopyrrole, and squarylium. Among these, from the viewpoints of enhancing the absorption waveform, the heat resistance, and the light fastness, azo, phthalocyanine, and anthraquinone are preferable, and anthraquinone is particularly preferable. Other examples thereof include coloring agent compounds described in "Functional Coloring Agents", co-authored by Shin Okawara, Ken Matsuoka, Tsuneaki Hirashima, and Eijiro Kitao, Kodansha Ltd., 1992, supervised by Sumio Tokita, and "Electronics-related Materials", CMC Publishing Co., Ltd., 1998.

Specific examples of the coloring agent compound used in the present invention are shown below, but the present invention is not limited thereto.

Anthraquinone

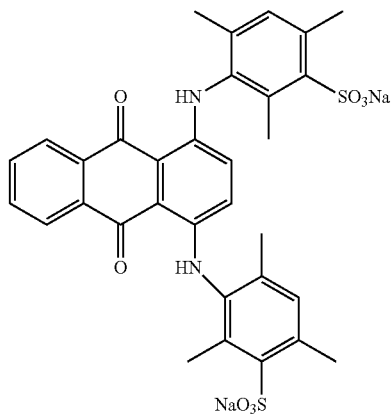

A-1

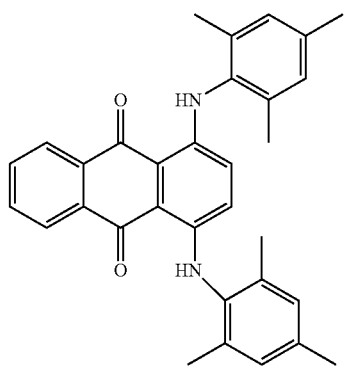

A-2

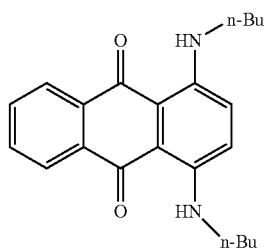

A-3

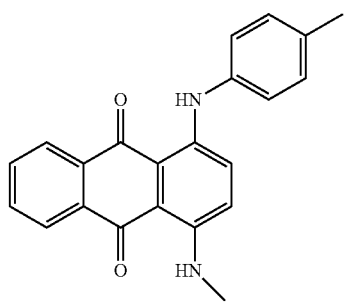

A-4

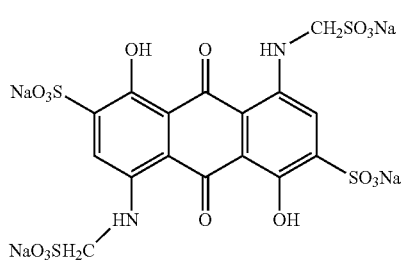

A-5

-continued
A-6
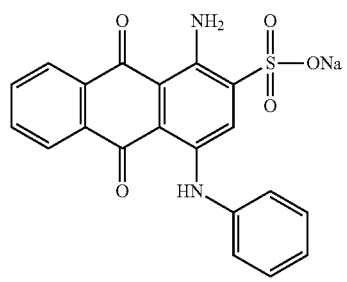
A-7
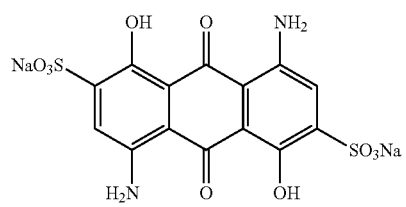
A-8
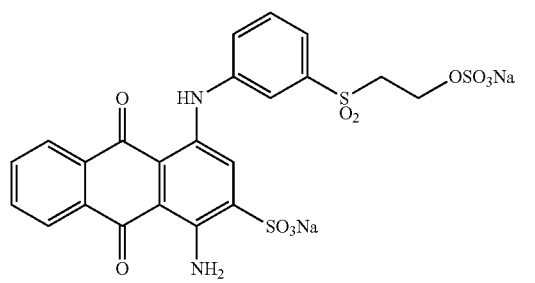
A-9
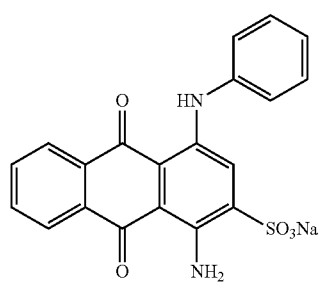
A-10
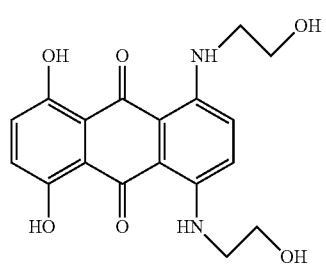
A-11
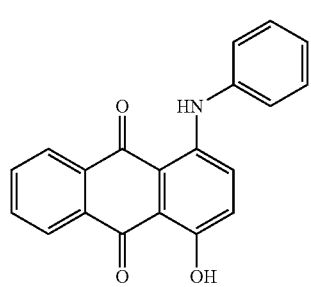
-continued
A-12
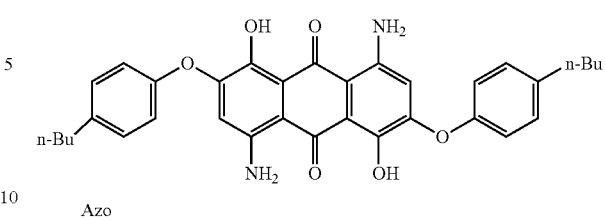
Azo
B-1
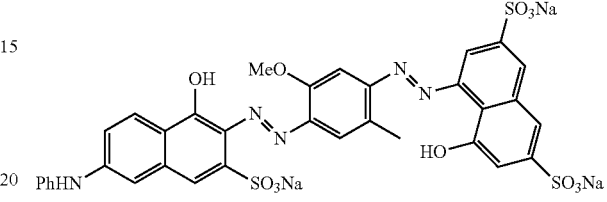
B-2
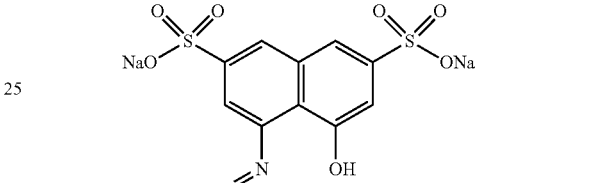
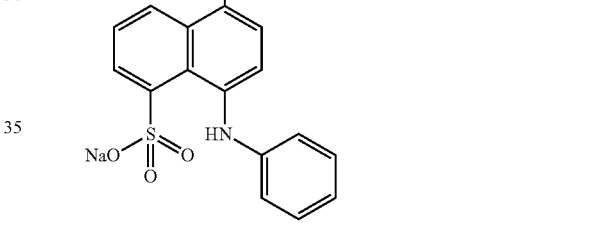
B-3
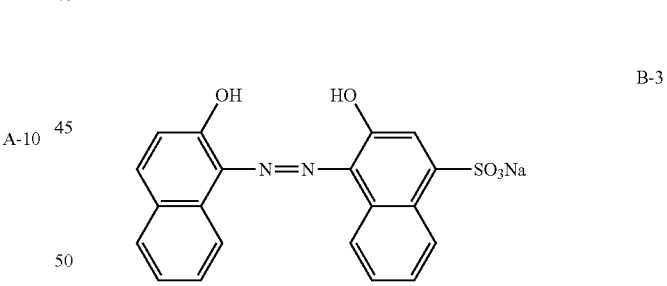
B-4
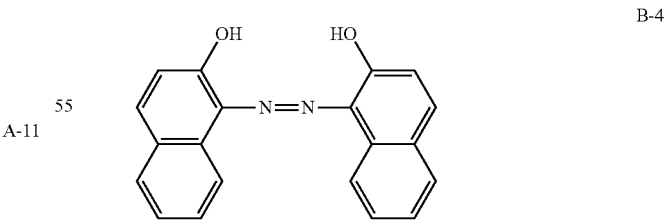
B-5
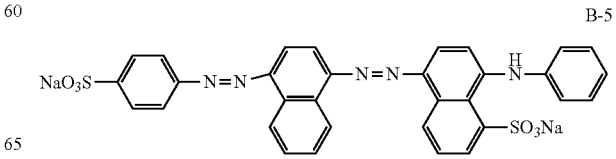

-continued

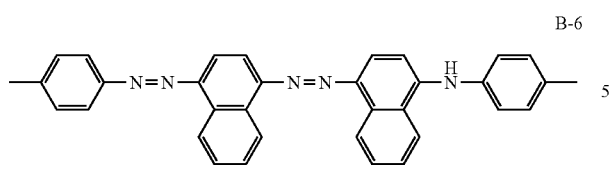
Triarylmethane

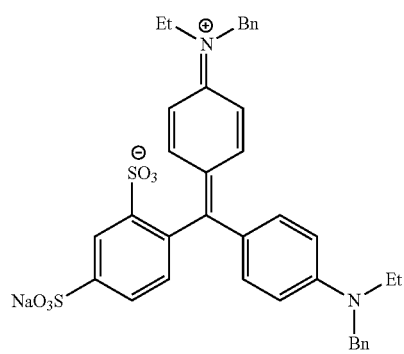

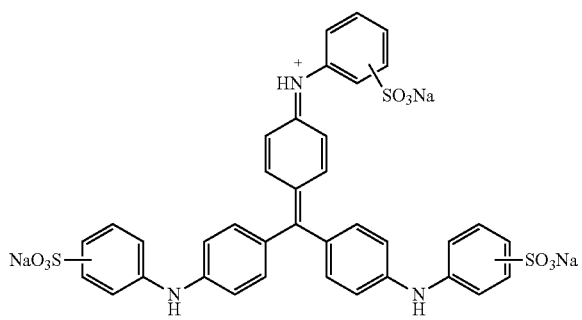
Oxazine

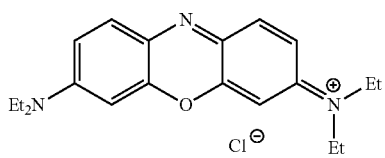

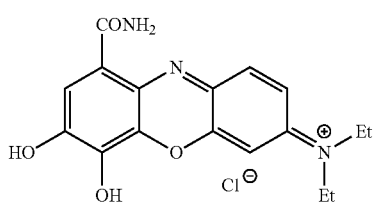
Phthalocyanine

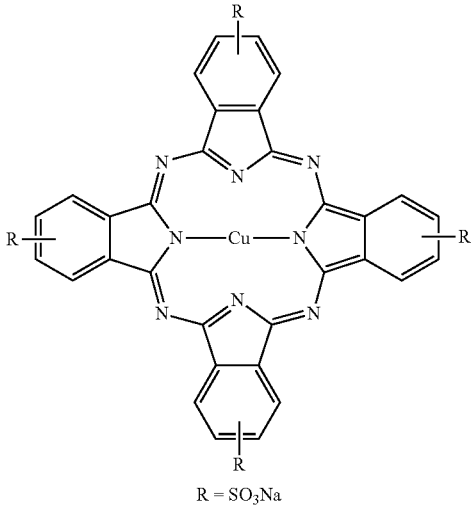
R = SO₃Na

[Polarizer]

The polarizer used in the present invention is not particularly limited as long as the polarizer is a member having an absorption axis in the plane and having a function of converting light into specific linearly polarized light, and a known polarizer of the related art can be used. As the polarizer, an iodine-based polarizer, a dye-based polarizer formed of a dichroic dye, a polyene-based polarizer, or the like is used. Examples of the iodine-based polarizer and the dye-based polarizer include a coating type polarizer and a stretching type polarizer, and both polarizers can be applied.

A polarizer in which a dichroic organic coloring agent is aligned by using alignment of the liquid crystal compound is preferable as the coating type polarizer, and a polarizer prepared by adsorbing iodine or a dichroic dye on polyvinyl alcohol and stretching the polyvinyl alcohol is preferable as the stretching type polarizer.

Examples thereof include an optically anisotropic layer containing a dichroic coloring agent compound that is horizontally aligned (direction intersecting the thickness direction of the optically anisotropic film) without containing the liquid crystal compound described in JP2010-152351A and an optically anisotropic layer containing the liquid crystal compound described in WO2017/154907A and a horizontally aligned dichroic coloring agent compound.

Further, examples of the method of obtaining a polarizer by stretching and dyeing a laminated film in which a polyvinyl alcohol layer is formed on a base material include methods described in JP5048120B, JP5143918B, JP4691205B, JP4751481B, and JP4751486B, and known techniques related to these polarizers can also be preferably used.

Here, the horizontal alignment denotes that a molecular axis of the liquid crystal compound or the dichroic coloring agent compound (for example, a major axis corresponds to the molecular axis in a case of a rod-like liquid crystal compound) is parallel to the main surface of the polarizer, but the axis is not required to be strictly parallel to the surface, and the tilt angle between an average molecular axis of the liquid crystal compound for the dichroic coloring agent compound in the polarizer and the main surface of the polarizer is less than ±10°. Further, the tilt angle can be measured using AxoScan OPMF-1 (manufactured by Opto Science, Inc.).

Specifically, an extinction coefficient ko [λ] (in-plane direction) and an extinction coefficient ke [λ] (thickness direction) are calculated using AxoScan OPMF-1 (manufactured by Opto science, Inc.) by measuring the Mueller matrix of the polarizer at a wavelength λ and at room temperature while the polar angle is changed from −50° to 500 by 10°, removing the influence of the surface reflection, and fitting the result to the following theoretical formula in consideration of the Snell's formula and Fresnel's equations. Unless otherwise specified, the wavelength λ is 550 nm.

$$k=-\log(T)\times\lambda/(4\pi d)$$

Here, T represents the transmittance, and d represents the thickness of the polarizer.

By calculating the absorbance and the dichroic ratio in the in-plane direction and the thickness direction based on the calculated ko [λ] and ke [λ], it can be confirmed whether the liquid crystal compound and the dichroic substance are horizontally aligned.

[Applications]

The optical film according to the embodiment of the present invention is not limited thereto, and is suitably used for preventing peeping into a display device and controlling a viewing angle range.

[Display Device]

A display device (image display device) according to the embodiment of the present invention includes the optical film including the polarizer described above and a display element.

It is preferable that the display element is disposed on the polarizer side of the optical film (that is, a side of the optical film opposite to the transparent film base material). The polarizer and the liquid crystal cell may be laminated via a known adhesive layer or a known pressure sensitive adhesive layer.

The display element used in the display device according to the embodiment of the present invention is not particularly limited, and examples thereof include a liquid crystal cell, an organic electroluminescence (hereinafter, abbreviated as "EL") display panel, and a plasma display panel.

Among these, a liquid crystal cell or an organic EL display panel is preferable. That is, as the display device according to the embodiment of the present invention, a liquid crystal display device obtained by using a liquid crystal cell as a display element or an organic EL display device obtained by using an organic EL display panel as a display element is preferable.

Some image display devices are thin and can be molded into a curved surface. Since an optically anisotropic film used in the present invention is thin and easily bent, the optically anisotropic film can be suitably applied to an image display device having a curved display surface.

Further, some image display devices have a pixel density of greater than 250 ppi and are capable of high-definition display. The optically anisotropic film used in the present invention can be suitably applied to such a high-definition image display device without causing moire.

[Liquid Crystal Display Device]

As the liquid crystal display device which is an example of the display device according to the embodiment of the present invention, an aspect in which a display device includes the above-described optical film including the polarizer and a liquid crystal cell is preferable.

Examples of the specific configuration thereof include a configuration in which the optical film according to the embodiment of the present invention is disposed on a front-side polarizing plate or a rear-side polarizing plate. In these configurations, the viewing angle at which the vertical direction or the horizontal direction is light-shielded can be controlled.

In addition, the optical film according to the embodiment of the present invention may be disposed on both the front-side polarizing plate and the rear-side polarizing plate. With such a configuration, it is possible to control the viewing angle in which the omniazimuth is light-shielded and light is transmitted only in the front direction.

Further, a plurality of the optical films according to the embodiment of the present invention may be laminated via a retardation layer. By controlling the retardation value and the optical axis direction, the transmission performance and the light shielding performance can be controlled. For example, the omniazimuth is light-shielded by arranging the polarizer, the optical film, the λ/2 wave plate (the axis angle is an angle deviated by 450 from the alignment direction of the polarizer), and the optical film so that the viewing angle control in which light is transmitted only in the front direction can be made. As the retardation layer, a positive A-plate, a negative A-plate, a positive C-plate, a negative C-plate, a B plate, an O plate, or the like can be used. From the viewpoint of reducing the thickness of the viewing angle control system, it is preferable that the thickness of the retardation layer is small as long as the optical characteristics, the mechanical properties, and the manufacturing suitability are not impaired, and specifically, the thickness thereof is preferably in a range of 1 to 150 μm, more preferably in a range of 1 to 70 μm, and still more preferably in a range of 1 to 30 μm.

Hereinafter, the liquid crystal cell constituting the liquid crystal display device will be described in detail.

<Liquid Crystal Cell>

It is preferable that the liquid crystal cell used for the liquid crystal display device is in a vertical alignment (VA) mode, an optically compensated bend (OCB) mode, an in-plane-switching (IPS) mode, or a twisted nematic (TN) mode, but the present invention is not limited thereto.

In the liquid crystal cell in a TN mode, rod-like liquid crystal molecules are substantially horizontally aligned at the time of no voltage application and further twisted aligned at 600 to 120°. The liquid crystal cell in a TN mode is most frequently used as a color TFT liquid crystal display device and is described in a plurality of documents.

In the liquid crystal cell in a VA mode, rod-like liquid crystal molecules are substantially vertically aligned at the time of no voltage application. The concept of the liquid crystal cell in a VA mode includes (1) a liquid crystal cell in a VA mode in a narrow sense where rod-like liquid crystal molecules are aligned substantially vertically at the time of no voltage application and substantially horizontally at the time of voltage application (described in JP1990-176625A (JP-H2-176625A)), (2) a liquid crystal cell (in an MVA mode) (SID97, described in Digest of tech. Papers (proceedings) 28 (1997) 845) in which the VA mode is formed to have multi-domain in order to expand the viewing angle, (3) a liquid crystal cell in a mode (n-ASM mode) in which rod-like liquid crystal molecules are substantially vertically aligned at the time of no voltage application and twistedly multi-domain aligned at the time of voltage application (described in proceedings of Japanese Liquid Crystal Conference, pp. 58 to 59 (1998)), and (4) a liquid crystal cell in a SURVIVAL mode (presented at LCD International 98). Further, the liquid crystal cell may be of any of a patterned vertical alignment (PVA) type, a photo-alignment (optical alignment) type, or a polymer-sustained alignment (PSA)

type. The details of these modes are described in JP2006-215326A and JP2008-538819A.

In the liquid crystal cell in an IPS mode, liquid crystal compounds are aligned substantially parallel to the substrate, and the liquid crystal molecules respond planarly through application of an electric field parallel to the substrate surface. That is, the liquid crystal compounds are aligned in the plane in a state where no electric field is applied. In the IPS mode, black display is carried out in a state where no electric field is applied, and absorption axes of a pair of upper and lower polarizing plates are orthogonal to each other. A method of reducing leakage light during black display in an oblique direction and improve the viewing angle using an optical compensation sheet is disclosed in JP1998-54982A (JP-H10-54982A), JP1999-202323A (JP-H11-202323A), JP1997-292522A (JP-H9-292522A), JP1999-133408A (JP-H11-133408A), JP1999-305217A (JP-H11-305217A), and JP1998-307291A (JP-H10-307291A).

[Organic EL Display Device]

As an organic EL display device which is an example of the display device according to the embodiment of the present invention, an aspect of a display device that includes the above-described optical film including the polarizer, a λ/4 plate, and an organic EL display panel in this order from the viewing side is suitably exemplified.

Further, similarly to the liquid crystal display device described above, a plurality of the optical films according to the embodiment of the present invention may be laminated via the retardation layer and disposed on the organic EL display panel. By controlling the retardation value and the optical axis direction, the transmission performance and the light shielding performance can be controlled.

Further, the organic EL display panel is a display panel formed of an organic EL element obtained by sandwiching an organic light emitting layer (organic electroluminescence layer) between electrodes (between a cathode and an anode). The configuration of the organic EL display panel is not particularly limited, and a known configuration is employed.

EXAMPLES

Hereinafter, the present invention will be described in more detail with reference to examples. The materials, the used amounts, the ratios, the treatment contents, the treatment procedures, and the like described in the following examples can be appropriately changed without departing from the spirit of the present invention. Therefore, the scope of the present invention should not be limitatively interpreted by the following examples.

Example 1

An optical film A of Example 1 was produced as follows.
[Formation of Alignment Film 1]

A cellulose acylate film (TAC base material having a thickness of 40 μm; TG40, FUJIFILM Corporation) was continuously coated with the following composition 1 for forming an alignment film using a wire bar. The support on which the coating film was formed was dried with hot air at 140° C. for 120 seconds to form an alignment film 1, thereby obtaining a TAC film 1 with an alignment film. The film thickness of the alignment film 1 was 0.5 μm.

(Composition 1 for forming alignment film)

| | |
|---|---|
| Polymer PA1 shown below: | 100.00 parts by mass |
| Acid generator PAG-1 shown below: | 8.25 parts by mass |
| Stabilizer DIPEA shown below: | 0.6 parts by mass |
| Methyl ethyl ketone: | 250.36 parts by mass |
| Butyl acetate: | 1001.42 parts by mass |

PA-1

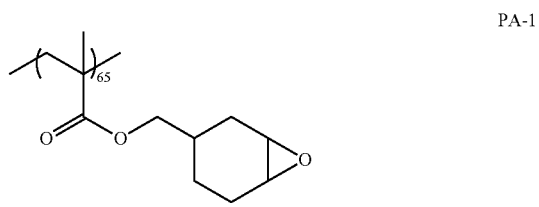

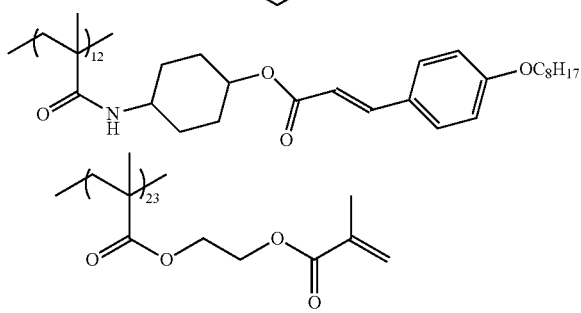

PAG-1

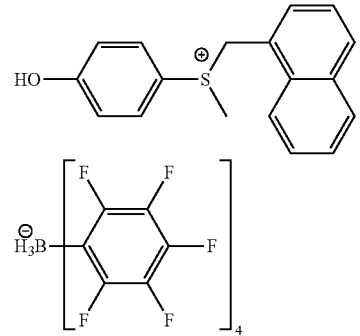

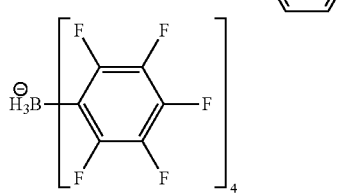

DIPEA

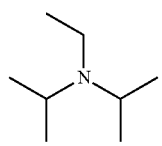

[Preparation of Optically Anisotropic Film 1]

The obtained alignment film 1 was continuously coated with the following liquid crystal composition 1 using a wire bar, heated at 120° C. for 60 seconds, and cooled to room temperature (23° C.).

Next, the coating layer P1 was heated at 85° C. for 60 seconds and cooled to room temperature again.

Thereafter, the film was irradiated with light of a light emitting diode (LED) (central wavelength of 365 nm) under an irradiation condition of an illuminance of 200 mW/cm$^2$ for 2 seconds, thereby preparing an optically anisotropic film 1 on the alignment film 1. The film thickness of the optically anisotropic film 1 was 3.5 μm.

| Composition of liquid crystal composition 1 | |
|---|---|
| Polymer liquid crystal compound L1 shown below: | 6.069 parts by mass |
| Low-molecular-weight liquid crystal compound L2 shown below: | 3.843 parts by mass |
| Dichroic substance Y1 shown below: | 0.659 parts by mass |
| Dichroic substance M1 shown below: | 0.162 parts by mass |
| Dichroic substance C1 shown below: | 1.629 parts by mass |
| Interface improver B1 shown below: | 0.004 parts by mass |

| -continued | |
|---|---|
| Composition of liquid crystal composition 1 | |
| Alignment agent B2 shown below: | 0.224 parts by mass |
| Alignment agent B3 shown below: | 0.224 parts by mass |
| Polymerization initiator (IRGACURE OXE-02, manufactured by BASF SE): | 0.187 parts by mass |
| Cyclopentanone: | 78.300 parts by mass |
| Benzyl alcohol: | 8.700 parts by mass |

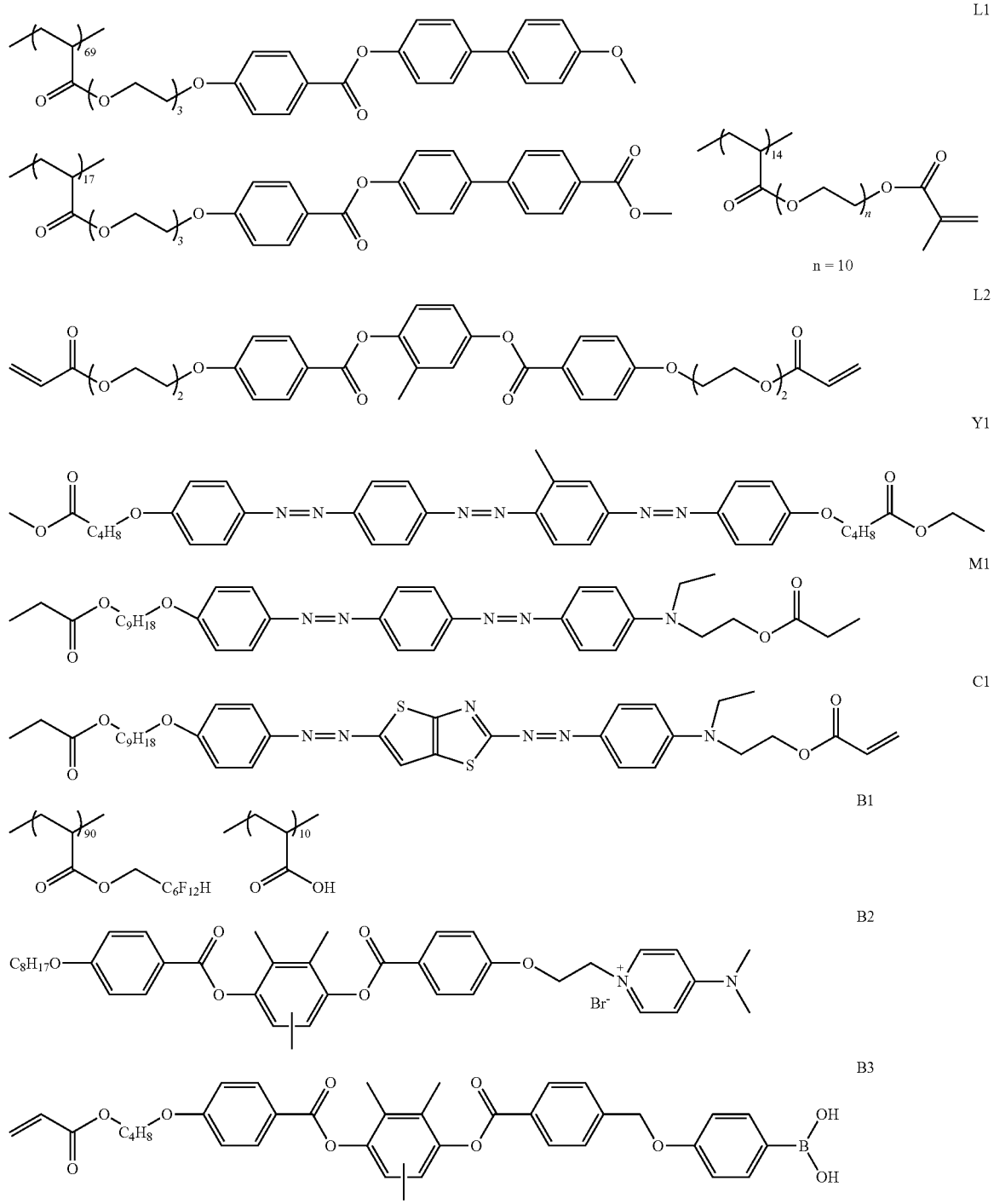

[Formation of Barrier Layer B1]

The obtained optically anisotropic film 1 was continuously coated with the following composition B1 for forming a tint adjusting layer using a wire bar, thereby forming a coating film.

Next, the support on which the coating film was formed was dried with hot air at 60° C. for 60 seconds and further dried with hot air at 100° C. for 120 seconds to form a tint adjusting layer G1, thereby obtaining an optical film 1. The film thickness of the barrier layer was 0.5 μm.

| (Composition B1 for forming tint adjusting layer) | |
|---|---|
| Modified polyvinyl alcohol PVA-1 shown above: | 3.80 parts by mass |
| IRGACURE 2959: | 0.20 parts by mass |
| Water: | 70 parts by mass |
| Methanol: | 30 parts by mass |

Modified Polyvinyl Alcohol PVA-1

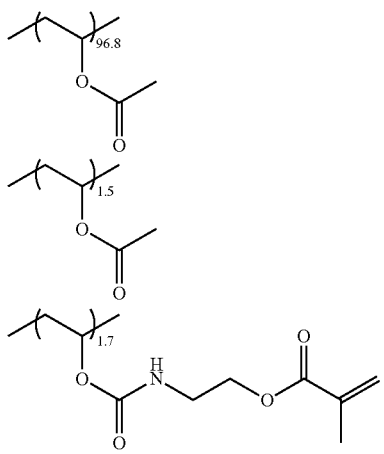

Comparative Example 1

An optical film H1 was prepared by forming an optically anisotropic film and a barrier layer in the same manner as in Example 1 except that the following liquid crystal composition H1 was used for the optically anisotropic film on the cellulose acylate film.

| Composition of liquid crystal composition H1 | |
|---|---|
| Polymer liquid crystal compound L1 shown above: | 8.185 parts by mass |
| Low-molecular-weight liquid crystal compound L2: | 4.079 parts by mass |
| Dichroic substance Y2 shown below: | 0.189 parts by mass |
| Dichroic substance M2 shown below: | 0.100 parts by mass |
| Dichroic substance C2 shown below: | 0.127 parts by mass |
| Interface improver B1 shown above: | 0.004 parts by mass |
| Alignment agent B2 shown above: | 0.158 parts by mass |
| Alignment agent B3 shown above: | 0.158 parts by mass |
| Polymerization initiator (IRGACURE OXE-02, manufactured by BASF SE): | 0.198 parts by mass |
| Cyclopentanone: | 58.120 parts by mass |
| Tetrahydrofuran: | 28.680 parts by mass |

Example 2

An optical film 2 was prepared by forming an optically anisotropic film and a barrier layer in the same manner as in Example 1 except that the following liquid crystal composition 2 was used for the optically anisotropic film on the cellulose acylate film.

| Composition of liquid crystal composition 2 | |
|---|---|
| Polymer liquid crystal compound L3 shown below: | 4.011 parts by mass |
| Dichroic substance Y3 shown below: | 0.792 parts by mass |
| Dichroic substance C3 shown below: | 0.963 parts by mass |
| Interface improver B1 shown above: | 0.087 parts by mass |
| Alignment agent B2 shown above: | 0.073 parts by mass |
| Alignment agent B3 shown above: | 0.073 parts by mass |
| Cyclopentanone: | 82.460 parts by mass |
| Benzyl alcohol: | 4.340 parts by mass |

L3

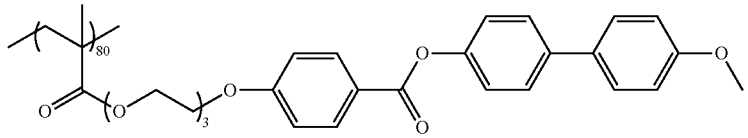

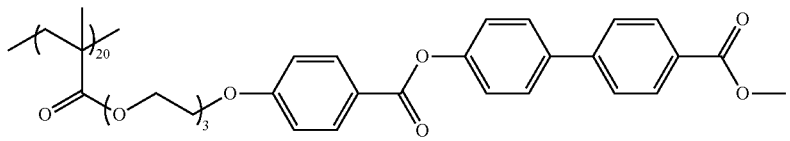

Y2

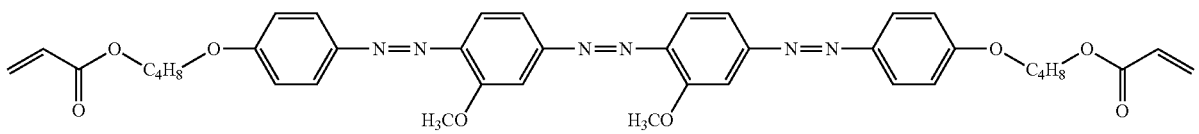

-continued

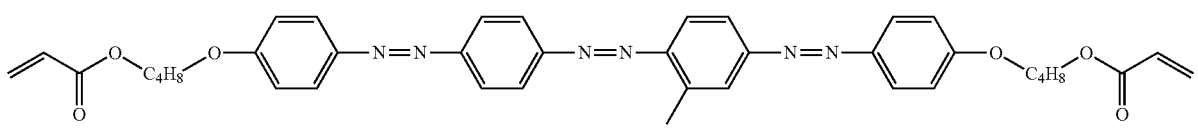
Y3

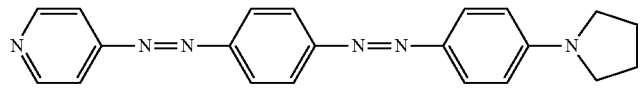
M2

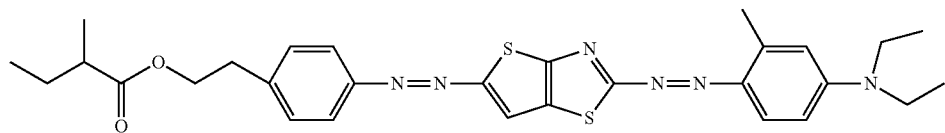
C2

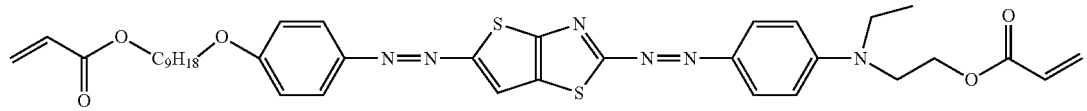
C3

Comparative Example 2

An optical film H2 was prepared by forming an optically anisotropic film and a barrier layer in the same manner as in Example 1 except that the following liquid crystal composition H2 was used for the optically anisotropic film on the cellulose acylate film.

| Composition of liquid crystal composition H2 | |
|---|---|
| Polymer liquid crystal compound L3 shown above: | 5.340 parts by mass |
| Dichroic substance Y3 shown above: | 0.160 parts by mass |
| Dichroic substance M3 shown below: | 0.184 parts by mass |
| Dichroic substance C4 shown below: | 0.340 parts by mass |
| Interface improver B1 shown above: | 0.004 parts by mass |
| Alignment agent B2 shown above: | 0.165 parts by mass |
| Alignment agent B3 shown above: | 0.165 parts by mass |
| Polymerization initiator (IRGACURE OXE-02, manufactured by BASF SE): | 0.146 parts by mass |
| Cyclopentanone: | 59.840 parts by mass |
| Tetrahydrofuran: | 33.660 parts by mass |

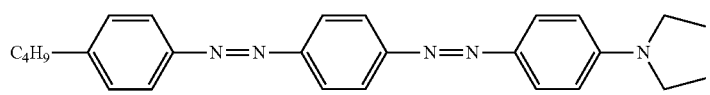
M3

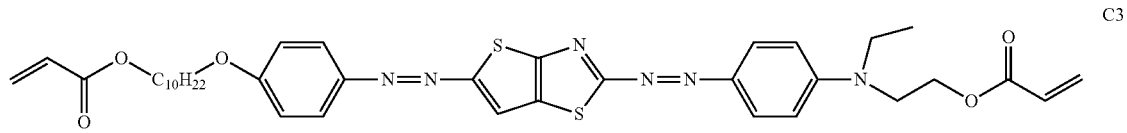
C3

Figure 4:
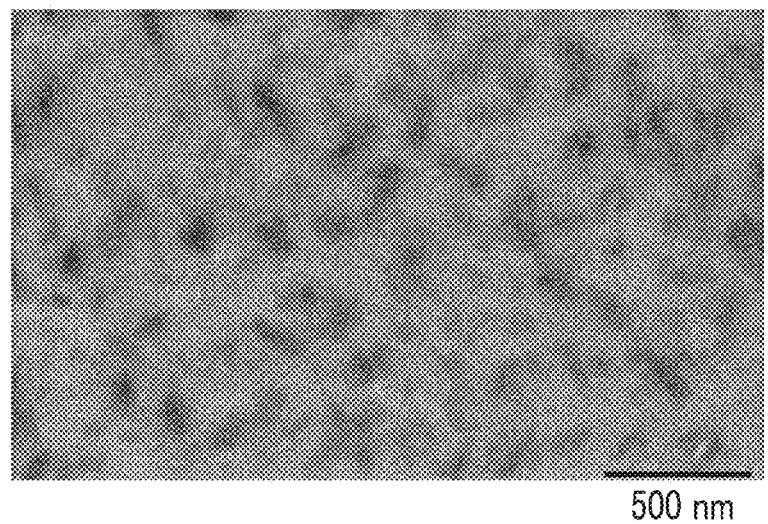
FIG. 4 is a scanning transmission electron micrograph of a cross section of the optically anisotropic film prepared in Example 1.
Figure 5:
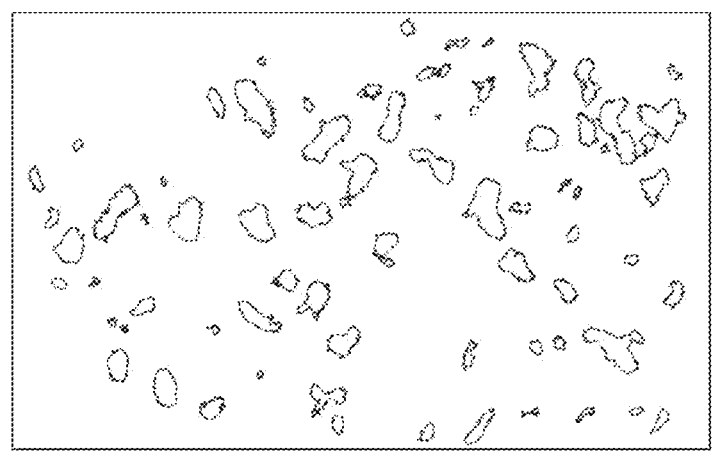
FIG. 5 is an image obtained by binarizing the brightness of the scanning transmission electron micrograph of FIG. 4 using a predetermined threshold value.

A scanning transmission electron micrograph of a cross section of the optically anisotropic film included in the optical film of Example 1 is shown in FIG. 4, and an image obtained by binarizing the brightness of the scanning transmission electron micrograph of FIG. 4 by the above-described method (for example, setting of a threshold value) is shown in FIG. 5.

Further, the length L of the major axis of the arrangement structure of each optically anisotropic film included in the optical film of Examples 1 and 2 and Comparative Examples 1 and 2 was measured by the method described above, and the number of the observed arrangement structures satisfying L≥30 nm and the number of the observed arrangement structures satisfying L≥240 nm are listed in Table 1.

Further, the angle between the major axis of the arrangement structure and the normal direction of the optically anisotropic film was measured for the optically anisotropic films included in the optical films of Examples 1 and 2 and Comparative Examples 1 and 2. The results are listed in Table 1.

Further, as a result of evaluation performed on the optically anisotropic films included in the optical films of Examples 1 and 2 by the method of evaluating vertical alignment described above, all the optically anisotropic films included in the optical films were formed such that the liquid crystal compound and the dichroic substance were vertically aligned.

[Evaluation]

The following evaluations were performed using the optical films of Examples 1 and 2 and Comparative Examples 1 and 2.

[Light Fastness]

The front transmittance (Tm0) of each optical film of the examples and the comparative examples was measured using AxoScan OPMF-1 (manufactured by Opto Science, Inc.). Subsequently, the optical film was set in a light fastness tester (Super Xenon Weather Meter SX75; manufactured by Suga Test Instruments Co., Ltd.) such that the incidence angle of the xenon light reached 600 and irradiated with xenon light at 60°, 50% RH, and 150 W/m² for 110 hours. The front transmittance (TX0) of the film after the light irradiation was measured in the same manner as described above, and the light fastness (ΔTxe) was evaluated by the following equation. The results are listed in Table 1.

$$\Delta Tx = |Tm0 - TX0|$$

A: ΔTxe was 1.0% or less
B: ΔTxe was greater than 1.0 and 1.5 or less
C: ΔTxe was greater than 1.5 and 3.0 or less
D: ΔTxe was greater than 3.0

[Durability]

The front transmittance (Tm0) of each optical film of the examples and the comparative examples was measured in the same manner as in the evaluation of light fastness.

Next, each optical film was set in a heat resistance tester at 95° C. and 25% RH (relative humidity) and heated for 110 hours.

The front transmittance (TH0) of the heated film was measured in the same manner as described above, and the durability (ΔTH) was evaluated by the following equation.

$$\Delta TH = |Tm0 - TH0|$$

A: ΔTH was 3.0% or less
B: ΔTH was greater than 3.0 and 5.0 or less
C: ΔTH was greater than 5.0 and 10.0 or less
D: ΔTH was greater than 10.0

[Contrast]

The Mueller matrix of each optical film of the examples and the comparative examples at a wavelength λ was measured at intervals of 10 degrees from a polar angle of −60 degrees to 60 degrees using AxoScan OPMF-1 (manufactured by Opto Science, Inc.). After removal of the influence of the surface reflection, the front transmittance (Tm0) and the transmittance (Tm30) at 30° were calculated, and the contrast (CR) was evaluated by the following equation.

$$CR = Tm0/Tm30$$

A: CR was 2.97 or greater
B: CR was less than 2.97 and 1.69 or greater
C: CR was less than 1.69 and 1.27 or greater
D: CR was less than 1.27 and 1.10 or greater
E: CR was less than 1.10

TABLE 1

| | Arrangement structure | | Ratio of number of arrangement structures in which angle between major axis of arrangement structure and normal direction of optically anisotropic film is 20° or greater | Light fastness ΔTxe | Durability ΔTH | Contrast CR |
|---|---|---|---|---|---|---|
| | Number of arrangement structures satisfying L ≥ 30 nm (per 40 μm²) | Number of arrangement structures satisfying L ≥ 240 nm (per 40 μm²) | | | | |
| Example 1 | 63 | 0 | 79.4% | A | A | A |
| Example 2 | 48 | 0 | 27.8% | A | D | B |
| Comparative Example 2 | 15 | 3 | 86.7% | C | C | E |
| Comparative Example 2 | 13 | 4 | 30.8% | C | C | D |

Preparation of Display Device

[Formation of Tint Adjusting Layer G1]

The optically anisotropic film 1 obtained in Example 1 was continuously coated with the following composition G1 for forming a tint adjusting layer using a wire bar, thereby forming a coating film.

Next, the support on which the coating film was formed was dried with hot air at 60° C. for 60 seconds and further dried with hot air at 100° C. for 120 seconds to form a tint adjusting layer G1, thereby obtaining an optical film 1a. The film thickness of the tint adjusting layer was 0.5 µm.

| (Composition G1 for forming tint adjusting layer) |
| --- |
| Modified polyvinyl alcohol PVA-1 shown above: 3.80 parts by mass |
| IRGACURE 2959: 0.20 parts by mass |
| Coloring agent compound G-1 shown below: 0.08 parts by mass |
| Water: 70 parts by mass |
| Methanol: 30 parts by mass |

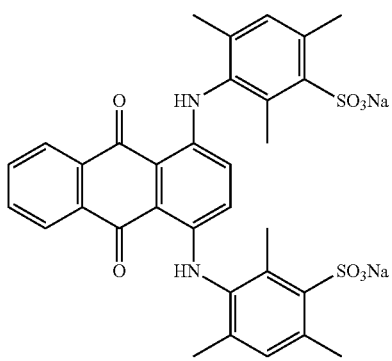

G-1

Preparation of Optical Laminate A1

A polarizing plate 1 in which the thickness of the polarizer was 8 µm and one surface of the polarizer was exposed was prepared by the same method as that for a polarizing plate 02 with a one-surface protective film described in WO2015/166991A.

The surface of the polarizing plate 1 in which the polarizer was exposed and the surface of the tint adjusting layer of the prepared optical film 1a were subjected to a corona treatment, and both surfaces were bonded to each other with the following PVA adhesive 1, thereby preparing an optical laminate A1.

<Preparation of PVA Adhesive 1>

20 parts of methylol melamine with respect to 100 parts of a polyvinyl alcohol-based resin containing an acetoacetyl group (average degree of polymerization: 1200, degree of saponification: 98.5% by mole, degree of acetoacetylation: 5% by mole) was dissolved in pure water under a temperature condition of 30° C. to prepare an aqueous solution in which the concentration of solid contents was adjusted to 3.7%.

Preparation of Image Display Device A1

A Wi-Fi model iPad Air (manufactured by APPLE, Inc.) with a capacity of 16 GB, which is an IPS mode liquid crystal display device, was disassembled to take out the liquid crystal cell. The viewing-side polarizing plate was peeled off from the liquid crystal cell, the laminate A1 prepared above was bonded to the surface formed by peeling the viewing-side polarizing plate such that the polarizing plate 1 side was the liquid crystal cell side, using the following pressure sensitive adhesive sheet 1. At this time, the bonding was carried out such that the direction of the absorption axis of the polarizing plate 1 was the same as the direction of the absorption axis of the viewing-side polarizing plate bonded to the product. After the bonding, the device was assembled again, thereby preparing an image display device A1.

(Preparation of Pressure Sensitive Adhesive Sheet 1)

An acrylate-based polymer was prepared according to the following procedures.

95 parts by weight of butyl acrylate and 5 parts by weight of acrylic acid were polymerized by a solution polymerization method in a reaction container equipped with a cooling pipe, a nitrogen introduction pipe, a thermometer, and a stirrer, thereby obtaining an acrylate-based polymer A1 with an average molecular weight of 2000000 and a molecular weight distribution (Mw/Mn) of 3.0.

Next, the obtained acrylate-based polymer A1 (100 parts by mass), CORONATE L (75 mass % ethyl acetate solution of trimethylolpropane adduct of tolylene isocyanate, number of isocyanate groups in one molecule: 3, manufactured by Nippon Polyurethane Industry Co., Ltd.) (1.0 parts by mass), and a silane coupling agent KBM-403 (manufactured by Shin-Etsu Chemical Co., Ltd.) (0.2 parts by mass) were mixed with each other, and ethyl acetate was finally added to the mixture such that the concentration of total solid contents reached 10% by mass, thereby preparing a composition for forming a pressure sensitive adhesive. A separate film subjected to a surface treatment with a silicone-based release agent was coated with the composition using a die coater and dried in an environment of 90° C. for 1 minute, thereby obtaining an acrylate-based pressure sensitive adhesive sheet. The film thickness thereof was 25 µm, and the storage elastic modulus thereof was 0.1 MPa.

In a case where a white display was performed using the image display device prepared in Example 1, the tints in the front direction and in an oblique direction were both neutral.

EXPLANATION OF REFERENCES

P: optically anisotropic film
  M: molecule of (first dichroic substance)
  O: molecule of (second dichroic substance)
  L: molecule of (liquid crystal compound)
  G: aggregate
  w: width
  a: angle

What is claimed is:
1. An optically anisotropic film comprising:
a liquid crystal compound; and
a dichroic substance,
wherein the liquid crystal compound is vertically aligned,
the dichroic substance forms an arrangement structure,
in a case where, in a cross section observed with a scanning transmission electron microscope, a length of a major axis of the arrangement structure is defined as L, and a length of a minor axis of the arrangement structure is defined as D, 16 or more arrangement structures satisfying L≥30 nm are observed per 40 µm$^2$, and wherein a ratio of the number of arrangement structures in which an angle between the major axis of the arrangement structure and a normal direction of the optically anisotropic film is 20° or greater to the number of the arrangement structures is 28.0% or greater.

2. An optical film comprising:
a transparent film base material; and
the optically anisotropic film according to claim 1, which is disposed on the transparent film base material.

3. The optical film according to claim 2, further comprising:
an alignment film between the transparent film base material and the optically anisotropic film.

4. The optical film according to claim 3, further comprising:
a polarizer which has an absorption axis in a plane,
wherein the optical film is used to control a viewing angle.

5. A display device comprising:
the optical film according to claim 4; and
a display element.

6. The optical film according to claim 2, further comprising:
a polarizer which has an absorption axis in a plane,
wherein the optical film is used to control a viewing angle.

7. An optically anisotropic film comprising:
a liquid crystal compound; and
a dichroic substance,
wherein the liquid crystal compound is vertically aligned,
the dichroic substance forms an arrangement structure,
in a case where, in a cross section observed with a scanning transmission electron microscope, a length of a major axis of the arrangement structure is defined as L, and a length of a minor axis of the arrangement structure is defined as D, 16 or more arrangement structures satisfying L≥30 nm are observed per 40 µm$^2$, and
wherein less than 3 arrangement structures satisfying L≥240 nm are observed per 40 µm$^2$.

8. An optical film comprising:
a transparent film base material; and
the optically anisotropic film according to claim 7, which is disposed on the transparent film base material.

9. The optical film according to claim 8, further comprising:
an alignment film between the transparent film base material and the optically anisotropic film.

10. The optical film according to claim 9, further comprising:
a polarizer which has an absorption axis in a plane,
wherein the optical film is used to control a viewing angle.

11. A display device comprising:
the optical film according to claim 10; and
a display element.

12. The optical film according to claim 8, further comprising:
a polarizer which has an absorption axis in a plane,
wherein the optical film is used to control a viewing angle.

* * * * *